(12) United States Patent
Oyama et al.

(10) Patent No.: US 10,893,216 B2
(45) Date of Patent: Jan. 12, 2021

(54) ELECTRONIC APPARATUS AND METHOD FOR CONTROLLING SAME

(71) Applicant: CANON KABUSHIKI KAISHA, Tokyo (JP)

(72) Inventors: Yasufumi Oyama, Kawasaki (JP); Shin Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/231,148

(22) Filed: Dec. 21, 2018

(65) Prior Publication Data

US 2019/0208141 A1    Jul. 4, 2019

(30) Foreign Application Priority Data

Dec. 28, 2017   (JP) .................................. 2017-254237

(51) Int. Cl.
  *H04N 5/262*  (2006.01)
  *H04N 5/232*  (2006.01)
  *G06T 7/70*   (2017.01)
  *H04N 5/225*  (2006.01)

(52) U.S. Cl.
  CPC ............ *H04N 5/2628* (2013.01); *G06T 7/70* (2017.01); *H04N 5/2252* (2013.01); *H04N 5/23238* (2013.01); *H04N 5/23248* (2013.01); *G06T 2207/10016* (2013.01); *G06T 2207/30244* (2013.01)

(58) Field of Classification Search
  CPC .............................. H04N 5/2628; G06T 7/70
  USPC ......................................................... 348/36
  See application file for complete search history.

(56) References Cited

U.S. PATENT DOCUMENTS

| 8,941,721 B2 | 1/2015 | Kim et al. |
| 10,609,279 B2 | 3/2020 | Izumihara et al. |
| 2003/0214603 A1 | 11/2003 | Manning |
| 2005/0146631 A1 | 7/2005 | Shelton et al. |
| 2006/0204079 A1 | 9/2006 | Yamaguchi |
| 2007/0188629 A1 | 8/2007 | Nakabe et al. |
| 2008/0298796 A1 | 12/2008 | Kuberka et al. |

(Continued)

FOREIGN PATENT DOCUMENTS

| CN | 103448634 A | 12/2013 |
| CN | 103888646 A | 6/2014 |

(Continued)

*Primary Examiner* — Amir Shahnami
(74) *Attorney, Agent, or Firm* — Canon U.S.A., Inc. IP Division

(57) ABSTRACT

An electronic apparatus includes an image acquisition unit configured to obtain a wide range image, an information acquisition unit configured to obtain attribute information including orientation information, and a control unit configured to control selection of any one of a plurality of processes based on a condition to display the wide range image, the plurality of processes including at least two of first to fourth processes, the first process providing a display in which a zenith and a yaw angle is corrected based on the orientation information, the second process providing a display in which the zenith is corrected based on the orientation information, the third process providing a display in which the yaw angle is corrected based on the orientation information, the fourth process providing a display in which neither the zenith nor the yaw angle of the wide range image is corrected.

15 Claims, 11 Drawing Sheets

(56) References Cited

U.S. PATENT DOCUMENTS

| | | |
|---|---|---|
| 2010/0271485 A1 | 10/2010 | Kim |
| 2010/0315525 A1 | 12/2010 | Ikeda |
| 2011/0050963 A1 | 3/2011 | Watabe |
| 2012/0120188 A1 | 5/2012 | Arai et al. |
| 2012/0154591 A1 | 6/2012 | Baur et al. |
| 2013/0162759 A1 | 6/2013 | Alakarhu et al. |
| 2013/0194447 A1 | 8/2013 | Sudo et al. |
| 2013/0222646 A1 | 8/2013 | Tsubota et al. |
| 2013/0342714 A1 | 12/2013 | Zhou et al. |
| 2014/0285617 A1 | 9/2014 | Arai et al. |
| 2015/0054965 A1 | 2/2015 | Sudo et al. |
| 2015/0156421 A1 | 6/2015 | Sokeila et al. |
| 2015/0178595 A1 | 6/2015 | Sawada et al. |
| 2015/0249785 A1 | 9/2015 | Mehta et al. |
| 2015/0278581 A1 | 10/2015 | Fukushima |
| 2016/0044276 A1 | 2/2016 | Shearman et al. |
| 2016/0182863 A1* | 6/2016 | Watanabe ............... H04N 7/181 348/148 |
| 2016/0191819 A1 | 6/2016 | Sakai |
| 2016/0219217 A1 | 7/2016 | Williams et al. |
| 2016/0269635 A1 | 9/2016 | Ito et al. |
| 2017/0076477 A1 | 3/2017 | Nakakusu |
| 2017/0150053 A1* | 5/2017 | Eline .................... B64C 39/024 |
| 2017/0176746 A1* | 6/2017 | Weller ............... G02B 27/0172 |
| 2017/0244943 A1 | 8/2017 | Saito et al. |
| 2017/0316600 A1 | 11/2017 | Jeong et al. |
| 2017/0324899 A1 | 11/2017 | Ohba |
| 2018/0077360 A1 | 3/2018 | Furukawa et al. |
| 2018/0120534 A1 | 5/2018 | Mohri |
| 2018/0130243 A1 | 5/2018 | Kim et al. |
| 2018/0152623 A1 | 5/2018 | Li |
| 2018/0205934 A1 | 7/2018 | Abbas et al. |
| 2018/0255236 A1 | 9/2018 | Izumihara et al. |
| 2018/0278821 A1 | 9/2018 | Yu et al. |
| 2018/0315156 A1 | 11/2018 | Shin |
| 2018/0332265 A1 | 11/2018 | Hwang et al. |
| 2019/0026858 A1 | 1/2019 | Lin et al. |
| 2019/0098180 A1 | 3/2019 | Tachi et al. |
| 2019/0132265 A1 | 5/2019 | Nowak-Przygodzki et al. |
| 2019/0158799 A1 | 5/2019 | Gao et al. |
| 2019/0251672 A1 | 8/2019 | Lim et al. |
| 2019/0253667 A1 | 8/2019 | Valli |
| 2019/0340737 A1* | 11/2019 | Kawaguchi ............ H04N 5/265 |

FOREIGN PATENT DOCUMENTS

| | | |
|---|---|---|
| CN | 204206295 U | 3/2015 |
| CN | 105191280 A | 12/2015 |
| CN | 105379244 A | 3/2016 |
| CN | 106161985 A | 11/2016 |
| CN | 106664349 A | 5/2017 |
| CN | 106911902 A | 6/2017 |
| CN | 106998413 A | 8/2017 |
| JP | 2016-019249 A | 2/2016 |
| JP | 2017-147682 A | 8/2017 |
| WO | 2013/133456 A1 | 9/2013 |

\* cited by examiner

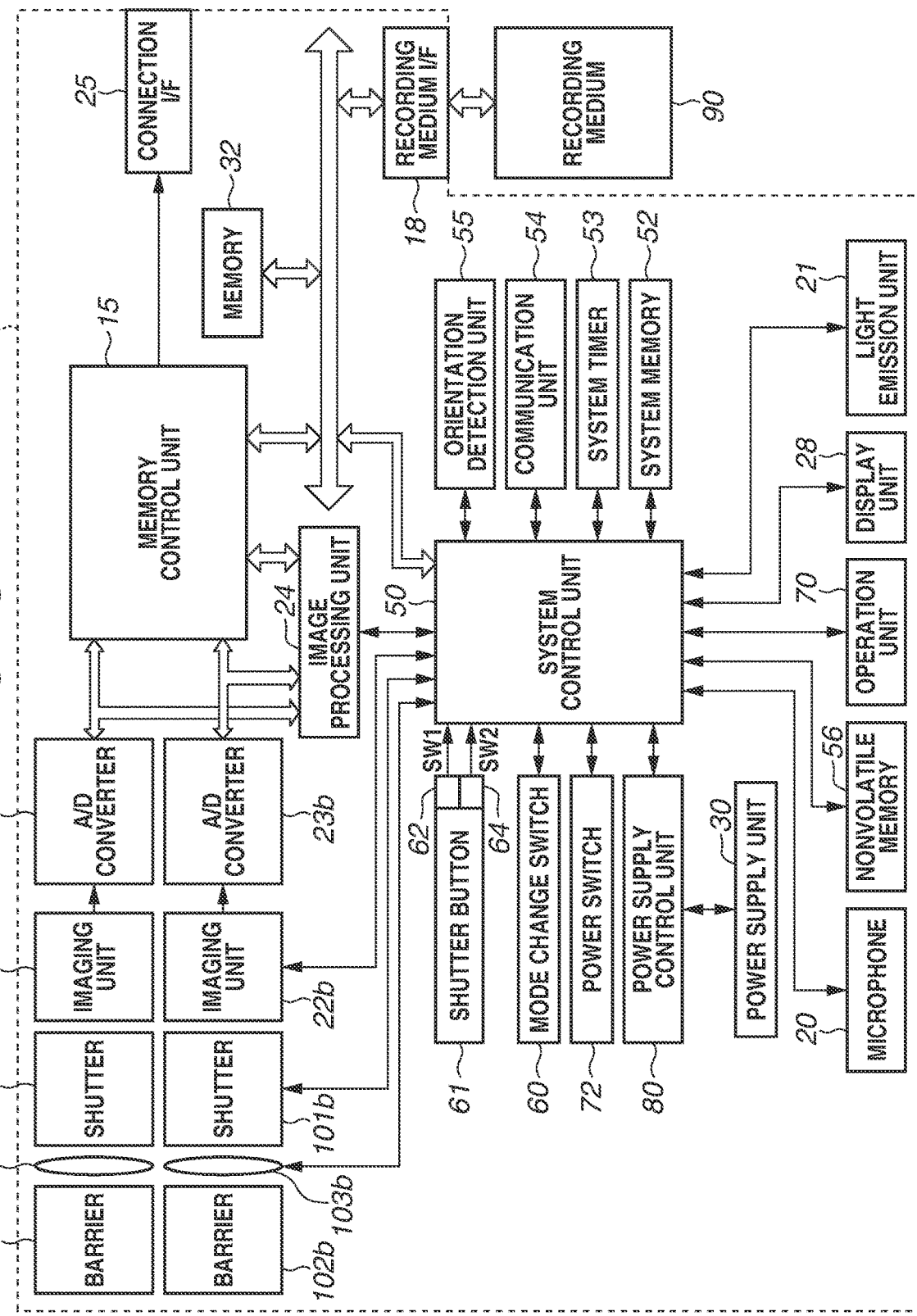

IMAGING SITUATION

PLAYBACK SITUATION: WITHOUT ZENITH CORRECTION

PLAYBACK SITUATION: WITH ZENITH CORRECTION

PLAYBACK SITUATION:
WITHOUT ZENITH CORRECTION
AND WITH YAW ANGLE CORRECTION

PLAYBACK SITUATION:
WITH ZENITH CORRECTION
AND YAW ANGLE CORRECTION

PLAYBACK SITUATION:
WITHOUT ZENITH CORRECTION
OR YAW ANGLE CORRECTION

PLAYBACK SITUATION:
WITH ZENITH CORRECTION AND
WITHOUT YAW ANGLE CORRECTION

IMAGING SITUATION

FIG.6A

```
INSTALLATION POSITION SETTING
      NOT SPECIFIED
      HANDHELD
      TRIPOD
      SELFIE STICK
   ▷  HELMET
      BODY WORN
      BICYCLE/SKI/SNOWBOARD
      CAR
```

FIG.6B

```
CORRECTION SETTING
   ☐ AUTOMATIC
 ▷ ☑ MANUAL
      ZENITH
      CORRECTION    ☑ ON  ☐ OFF
      YAW ANGLE
      CORRECTION    ☑ ON  ☐ OFF
```

ELECTRONIC APPARATUS AND METHOD FOR CONTROLLING SAME

BACKGROUND OF THE INVENTION

Field of the Invention

The present invention relates to an electronic apparatus which displays or records a wide range image having a wide field view angle.

Description of the Related Art

There are known imaging apparatuses that can capture an entire celestial sphere image (omnidirectional image or all-around image) in 360° directions by one imaging operation Imaging apparatuses that capture an image of a wide range of 180° or more, if not 360°, are also known. There are known methods for displaying a partial display range of such an image and changing and displaying the display range based on user's operations or the orientation of a display apparatus. In such a display, the display range can be mainly changed in directions of rotation about two axes, including the direction of rotation within a horizontal plane about the zenith and the direction of vertical rotation (direction for changing an angle of elevation or angle of depression).

Japanese Patent Application Laid-Open No. 2017-147682 discusses a technique in which an orientation of an omnidirectional camera is detected, a tilt of an image by the camera in a vertical direction is corrected, and, within a horizontal plane, minute vibrations that are considered to be a camera shake component are corrected, while intentional rotations of the camera within the horizontal plane are tracked.

In a case where an image captured while an imaging apparatus is tilted is displayed, it is often difficult for a user to view the image if the displayed image is at a tilt with respect to the zenith in a manner similar to the tilted orientation of the imaging apparatus. Such an image may become easier to view if the tilt is corrected in the vertical direction (zenith correction) and the corrected image is displayed, as discussed in Japanese Patent Application Laid-Open No. 2017-147682. However, depending on a captured image or user's intention, displaying an image without the zenith correction is sometimes more appropriate.

If an image is rotated based on rotation of the imaging apparatus within the horizontal plane during imaging (rotation in a yaw direction), the viewing direction during playback varies without the user changing the viewing direction. The user is then unable to view in a desired direction.

SUMMARY OF THE INVENTION

The present invention is directed to displaying a wide range image in a more appropriate direction.

According to an aspect of the present invention, an electronic apparatus includes a memory and at least one processor and/or at least one circuit to perform the operations of the following units: an image acquisition unit configured to obtain a wide range image captured by one or more imaging units, an information acquisition unit configured to obtain attribute information attached to the wide range image, the attribute information including orientation information indicating an orientation of an imaging apparatus during imaging, and a control unit configured to control selection of any one of a plurality of processes based on a condition to display the wide range image, the plurality of processes including at least two of first to fourth processes, the first process providing a display in which a zenith and a yaw angle is corrected based on the orientation information, the second process providing a display in which the zenith is corrected based on the orientation information without correcting the yaw angle, the third process providing a display in which the yaw angle is corrected based on the orientation information without correcting the zenith, the fourth process providing a display in which neither the zenith nor the yaw angle of the wide range image is corrected.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 1C is a configuration block diagram illustrating the digital camera.

FIG. 6A is a diagram illustrating a display example of an installation position setting screen. FIG. 6B is a diagram illustrating a display example of a correction setting screen.

DESCRIPTION OF THE EMBODIMENTS

Figure 1A:
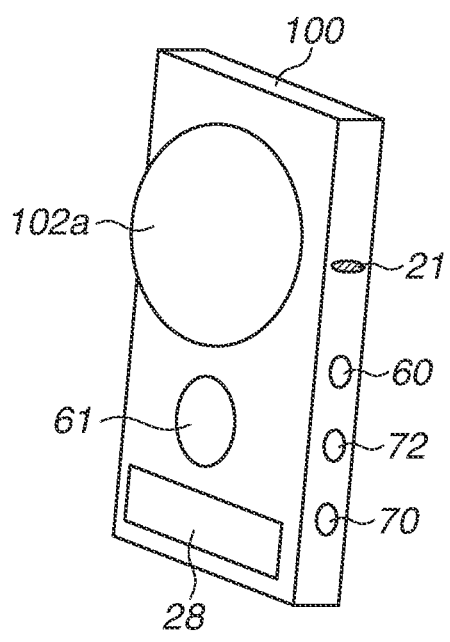
FIG. 1A is a diagram illustrating a front external view of a digital camera.

An exemplary embodiment of the present invention will be described in detail below with reference to the accompanying drawings.

A barrier 102a is a protection window of an imaging lens 103a intended for a camera unit a (i.e., barrier 102a, shutter 101a, imaging unit 22a, and A/D converter 23a), which has an imaging range in front of the digital camera 100. An outside surface of the imaging lens 103a itself may serve as the barrier 102a. The camera unit a is a wide-angle camera having an imaging range as wide as vertically and horizontally 180° or more in front of the digital camera 100. A barrier 102b is a protection window of an imaging lens 103b intended for a camera unit b (i.e., barrier 102b, shutter 101b, imaging unit 22b, and A/D converter 23b), which has an imaging range behind the digital camera 100. An outside surface of the imaging lens 103b itself may serve as the barrier 102b. The camera unit b is a wide-angle camera having an imaging range as wide as vertically and horizontally 180° or more behind the digital camera 100.

Figure 1B:
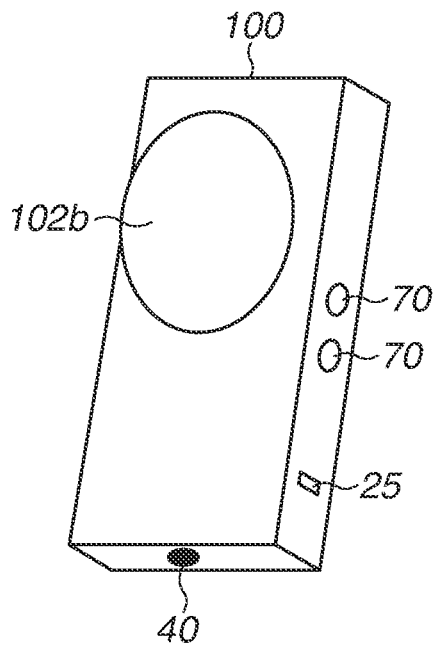
FIG. 1B is a diagram illustrating a rear external view of the digital camera.

FIG. 1A illustrates a front perspective view (external view) of a digital camera 100 (imaging apparatus), which is an electronic apparatus. FIG. 1B illustrates a rear perspective view (external view) of the digital camera 100. The digital camera 100 is an omnidirectional camera (entire celestial sphere camera).

A display unit 28 is a display unit for displaying various types of information. A shutter button 61 is an operation unit for giving an imaging instruction. A mode change switch 60 is an operation unit for switching various modes. A connection interface (I/F) 25 is a connector between the digital camera 100 and a connection cable for connecting to an external device, such as a smartphone, a personal computer, and a television set. An operation unit 70 is an operation unit including operation members such as various switches, buttons, dials, and touch sensors for accepting various operations from a user. A power switch 72 is a push button for switching power on and off.

A light emission unit 21 is a light emission member such as a light-emitting diode (LED). The light emission unit 21 notifies the user of various states of the digital camera 100 by using light emission patterns and light emission colors. A fixing portion 40 is a tripod screw hole. The fixing portion 40 is, for example, a member for fixing and installing the digital camera 100 onto a fixing device such as a tripod. The fixing portion 40 is arranged in the bottom surface of the digital camera 100.

FIG. 1C is a block diagram illustrating a configuration example of the digital camera 100. The barrier 102a covers an imaging system of the camera unit a of the digital camera 100 including the imaging lens 103a, and thereby prevents stains and damage to the imaging system including the imaging lens 103a, a shutter 101a, and an imaging unit 22a. The imaging lens 103a is a lens unit including a zoom lens and a focus lens. The imaging lens 103a is a wide-angle lens. The shutter 101a is a shutter having an aperture function of adjusting the amount of object light incident on the imaging unit 22a. The imaging unit 22a is an image sensor (imaging sensor) such as a charge-coupled device (CCD) sensor or complementary metal-oxide-semiconductor (CMOS) sensor for converting an optical image into an electrical signal. An analog-to-digital (A/D) converter 23a converts an analog signal output from the imaging unit 22a into a digital signal. The imaging lens 103a, the shutter 101a, and the imaging unit 22a are controlled by a system control unit 50.

The barrier 102b covers an imaging system of the camera unit b of the digital camera 100 including the imaging lens 103b, and thereby prevents stains and damage to the imaging system including the imaging lens 103b, a shutter 101b, and an imaging unit 22b. The imaging lens 103b is a lens unit including a zoom lens and a focus lens. The imaging lens 103b is a wide-angle lens. The shutter 101b is a shutter having an aperture function of adjusting the amount of object light incident on the imaging unit 22b. The imaging unit 22b is an image sensor such as a CCD sensor or CMOS sensor for converting an optical image into an electrical signal. An A/D converter 23b converts an analog signal output from the imaging unit 22b into a digital signal. The imaging lens 103b, the shutter 101b, and the imaging unit 22b are controlled by the system control unit 50.

The imaging units 22a and 22b capture a virtual reality (VR) image. A VR image refers to an image that can be VR-displayed (displayed in a VR view). VR images include an omnidirectional image (entire celestial sphere image) captured by an omnidirectional camera (entire celestial sphere camera), and a panoramic image having a video range (effective video range) wider than a display range that can be displayed on a display unit at a time. VR images include not only still images but also moving images and live images (images obtained from a camera almost in real time). A VR image has a video range (effective video range) of a field of view of up to 360° in a vertical direction (vertical angle, angle from the zenith, angle of elevation, angle of depression, elevation angle, or pitch angle) and 360° in a horizontal direction (horizontal angle, azimuth angle, yaw angle, or yaw direction). VR images also include an image having an angle of view (field of view range) wider than the angle of view that can be captured by a normal camera, or an image having a video range (effective video range) wider than a display range that can be displayed on a display unit at a time, even if vertically smaller than 360° and/or horizontally smaller than 360°. For example, an image captured by an entire celestial sphere camera that can capture an image of an object in a field of view (angle of view) of 360° in the horizontal direction (horizontal angle or azimuth angle) and 210° in the vertical angle about the zenith is a kind of VR image. For example, an image captured by a camera that can capture an image of an object in a field of view (angle of view) of 180° in the horizontal direction (horizontal angle or azimuth angle) and 180° in the vertical angle about the horizontal direction is a kind of VR image. Thus, an image that has a video range of a field of view of 160° (±80°) or more in both the vertical and horizontal directions and has a video range wider than a range that a human can visually observe at a time is a kind of VR image. If such a VR image is VR-displayed, the user can view an omnidirectional image that is seamless in the horizontal direction (horizontal rotation direction) by changing the orientation of the display device in the horizontal rotation direction. In the vertical direction (vertical rotation direction), the user can view an omnidirectional image that is seamless within the range of ±105° as seen from directly above (the zenith). The range beyond 105° from directly above is a blank area where there is no video image. A VR image can be said to be an "image having a video range that is at least part of a virtual space (VR space)".

VR display refers to a display method that can change the display range of a VR image where a video image within the field of view range according to the orientation of the display device is displayed. If the user wears and views a head-mounted display (HMD) serving as the display device, a video image within the field of view range according to the direction of the user's face is displayed. For example, suppose that a video image having a field of view angle (angle of view) about 0° in the horizontal direction (a specific direction such as to the north) and 90° in the vertical direction (90° from the zenith, i.e., horizontal) in a VR image is displayed at a specific point at a certain time. If the orientation of the display unit is reversed from such a state (e.g., the display surface is changed from southward to northward), the display range of the same VR image is changed to a video image having a field of view angle setting 180° as a center in the horizontal direction (the opposite direction such as to the south) and setting 90° as a center in the vertical direction (horizontal). In a case of viewing the HMD, if the user turns the face from the north to the south (i.e., turns back), the video image displayed on the HMD also changes from a video image of the north to a video image of the south. Such VR display can visually provide the user a sense (sense of immersion) as if the user is present inside the VR image (in the VR space). A smartphone mounted on a VR goggles (head mount adapter) can be said to be a kind of HMD. The method for displaying a VR image is not limited to the foregoing VR display. The field of view range can be changed and displayed by moving (scrolling) the display range according to user operations on a touch panel or directional buttons, instead of changing orientation.

An image processing unit 24 performs predetermined resizing processing, such as pixel interpolation and reduction, and color conversion processing on data from the A/D converters 23a and 23b or data from a memory control unit 15. The image processing unit 24 also performs predetermined calculation processing by using captured image data. The system control unit 50 performs exposure control and distance measurement control based on the calculation results obtained by the image processing unit 24. Automatic focus (AF) processing, automatic exposure (AE) processing, and flash preliminary emission (electronic flash (EF)) processing are thereby performed. The image processing unit 24 further performs predetermined calculation processing by using the captured image data, and performs automatic white balance (AWB) processing based on the obtained calculation results. The image processing unit 24 applies basic image processing to two images (fish-eye images or wide-angle images) obtained from the A/D converters 23a and 23b, and then combines (performs connection image processing on) the two images to generate a single VR image. In the connection image processing of the two images, the image processing unit 24 calculates, with respect to each of the two images, amounts of deviation between a reference image and a comparative image by pattern matching processing for each area, and detects connection positions. The image processing unit 24 then corrects distortion of each of the two images by geometric transformation and converts each image into an entire celestial sphere image format, in consideration of the detected connection positions and the lens characteristics of the respective optical systems. The image processing unit 24 blends the two images of the entire celestial sphere image format to eventually generate a single entire celestial sphere image (VR image). The generated entire celestial sphere image (VR image) is an image of equidistant cylindrical projection, and the position of each pixel can be associated with coordinates on a spherical surface. During live viewing of VR display or during playback, the image processing unit 24 performs image clipping processing, enlargement processing, and distortion correction for a VR display of the VR image, and performs rendering to draw the VR image in a video random access memory (VRAM) of a memory 32.

Output data from the A/D converters 23a and 23b is written to the memory 32 via the image processing unit 24 and the memory control unit 15, or via the memory control unit 15 without the intervention of the image processing unit 24. The memory 32 stores image data that is obtained by the imaging units 22a and 22b and converted into digital data by the A/D converters 23a and 23b, and images to be output to an external display from the connection I/F 25. The memory 32 has a storage capacity sufficient to store a predetermined number of still images and a predetermined duration of moving images and audios.

The memory 32 also serves as an image display memory (video memory). Image display data stored in the memory 32 can be output to an external display from the connection I/F 25. An electronic viewfinder can be implemented to provide a live view display (LV display) by successively transferring and displaying VR images that are captured by the imaging units 22a and 22b, generated by the image processing unit 24, and stored in the memory 32 onto an external display. Hereinafter, an image displayed in a live view will be referred to as an LV image. A live view display (remote LV display) can also be performed by transferring VR images stored in the memory 32 to an external device (e.g., a smartphone) wirelessly connected via a communication unit 54 and displaying the VR images on the external device. The main body of the digital camera 100 may be configured to include a main body display capable of displaying an image, and a video image equivalent to that described to be output from the connection I/F 25 and displayed on an external display may be displayed on the main body display.

A nonvolatile memory 56 is a memory serving as an electrically erasable and recordable recording medium. For example, an electrically erasable programmable read-only memory (EEPROM) is used as the nonvolatile memory 56. The nonvolatile memory 56 stores operating constants and programs for the system control unit 50. The programs here refer to computer programs for implementing various flowcharts to be described below in the present exemplary embodiment.

The system control unit 50 is a control unit including at least one processor or circuit, and controls the entire digital camera 100. The system control unit 50 implements various types of processing according to the present exemplary embodiment to be described below by executing the programs recorded in the nonvolatile memory 56. A system memory 52 includes, for example, a random access memory (RAM) e. Operating constants and variables for the system control unit 50 and the programs read from the nonvolatile memory 56 are loaded into the system memory 52. The system control unit 50 also performs display control by controlling the memory 32, the image processing unit 24, and the memory control unit 15.

A system timer 53 is a timer unit for measuring time used for various controls and the time of a built-in clock.

The mode change switch 60, the shutter button 61, and the operation unit 70 are operation units for inputting various operation instructions to the system control unit 50. The mode change switch 60 switches an operation mode of the system control unit 50 to any one of a still image recording mode, a moving image capturing mode, a playback mode, and a communication connection mode. The still image recording mode includes an automatic imaging mode, an automatic scene determination mode, a manual mode, an aperture priority mode (Av mode), a shutter speed priority mode (Tv mode), and a program AE mode. There are also various scene modes and custom modes, which are imaging settings specific to respective imaging scenes. The user can directly switch to any one of the modes by using the mode change switch 60. Alternatively, the user may once switch to a list screen of imaging modes by using the mode change switch 60, and then select and switch to any one of a plurality of modes displayed on the display unit 28 by using other operation members. Similarly, the moving image capturing mode may include a plurality of modes.

A first shutter switch 62 turns on to generate a first shutter switch signal SW1 if the shutter button 61 provided on the digital camera 100 is operated halfway, i.e., half-pressed (imaging preparation instruction). Imaging preparation operations such as the AF processing, the AE processing, the AWB processing, and the EF processing are started in response to the first shutter switch signal SW1.

A second shutter switch 64 turns on to generate a second shutter switch signal SW2 if the operation of the shutter button 61 is completed, i.e., the shutter button 61 is full-pressed (imaging instruction). In response to the second shutter switch signal SW2, the system control unit 50 starts a series of operations for imaging processing from the reading of signals from the imaging units 22a and 22b to the writing of image data to a recording medium 90.

The shutter button 61 is not limited to the button allowing a full-press and a half-press, i.e., two stages of operations, and may be an operation member only allowing one stage of pressing. In such a case, the imaging preparation operations and the imaging processing are continuously performed according to one stage of pressing. Such operations are similar to those executed when a shutter button allowing a half-press and a full-press is fully pressed at once (operations executed when the first and second shutter switch signals SW1 and SW2 are generated almost at the same time).

The operation members of the operation unit 70 are respectively assigned appropriate functions scenes and function as various function buttons if various function icons and options displayed on the display unit 28 are selected and operated. Examples of the function buttons include an end button, a back button, an image forward button, a jump button, a narrow-down button, and an attribute change button. For example, if a menu button is pressed, a menu screen allowing various settings is displayed on the display unit 28. The user can intuitively make various settings by operating the operation unit 70 while viewing the menu screen displayed on the display unit 28.

A power supply control unit 80 includes a battery detection circuit, a direct-current-to-direct-current (DC-DC) converter, and a switch circuit for switching blocks to be energized. The power supply control unit 80 detects the presence or absence of a battery attached, the type of the battery, and the remaining battery level. Based on the detection results and instructions from the system control unit 50, the power supply control unit 80 controls the DC-DC converter to supply required voltages to various parts including the recording medium 90 for required periods. A power supply unit 30 includes a primary battery such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter.

A recording medium I/F 18 is an I/F with the recording medium 90 such as a memory card and a hard disk. The recording medium 90 is a recording medium for recording captured images. Examples of the recording medium 90 include a memory card, a semiconductor memory, an optical disk, and a magnetic disk. The recording medium 90 may be a replaceable recording medium that is attachable to and detachable from the digital camera 100, or a built-in recording medium.

The communication unit 54 is connected wirelessly or by a wired cable, and transmits and receives video signals and audio signals. The communication unit 54 can also be connected to a wireless local area network (LAN) and the Internet. The communication unit 54 can also communicate with an external device via Bluetooth® or Bluetooth® Low Energy. The communication unit 54 can transmit images (including LV images) captured by the imaging units 22a and 22b and images recorded on the recording medium 90, and receive images and other various types of information from an external device.

An orientation detection unit 55 detects the orientation of the digital camera 100 with respect to the direction of gravity. Whether the images captured by the imaging units 22a and 22b are captured with the digital camera 100 held landscape or with the digital camera 100 held portrait, can be determined based on the orientation detected by the orientation detection unit 55. Degrees of tilts of the captured image in three axial directions, i.e., yaw, pitch, and roll, can also be determined. The system control unit 50 can add direction information according to the orientation detected by the orientation detection unit 55 to the image file of a VR image captured by the imaging units 22a and 22b, or rotate (adjust the direction of the image for tilt correction) and record the image. Two or more of an acceleration sensor, a gyro sensor, a geomagnetic sensor, an azimuth sensor, and an altitude sensor may be used in combination as the orientation detection unit 55. A motion, such as a pan, a tilt, lifting, and whether remaining stationary or not, of the digital camera 100 can be detected by using an acceleration sensor, a gyro sensor, and/or an azimuth angle sensor serving as the orientation detection unit 55.

A microphone 20 is for collecting sounds around the digital camera 100 to be recorded as the audio of a moving image of a VR image.

The connection I/F 25 is a connection plug for a High-Definition Multimedia Interface (HDMI®) cable or a Universal Serial Bus (USB) cable. The connection I/F 25 is intended to connect to an external device and transmit and receive video images.

Figure 2A:
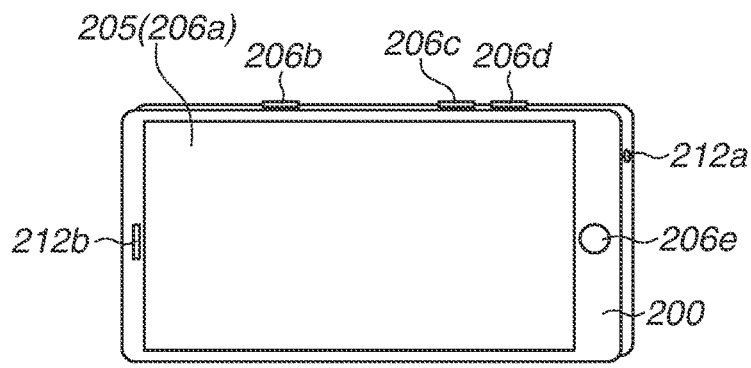
FIG. 2A is a diagram illustrating an external view of a display control apparatus.

FIG. 2A illustrates an example of an external view of a display control device 200, which is a kind of electronic apparatus. An example of the display control device 200 (electronic apparatus) is a smartphone. A display 205 is a display unit for displaying images and various types of information. As will be described below, the display 205 is integrally configured with a touch panel 206a, and can detect touch operations on the display surface of the display 205. The display control device 200 can provide a VR display of a VR image (VR contents) on the display 205. As illustrated in the FIG. 2A, an operation unit 206 includes the touch panel 206a and operation units 206b, 206c, 206d, and 206e. The operation unit 206b is a power button that accepts an operation for switching the power of the display control device 200 on and off. The operation units 206c and 206d are volume buttons for increasing and decreasing the volume of sound output from an audio output unit 212. The operation unit 206e is a home button for displaying a home screen on the display 205. An audio output terminal 212a is an earphone jack, an output terminal for outputting sound to an earphone or an external speaker. The speaker 212b is a main body built-in speaker for issuing sound.

Figure 2B:
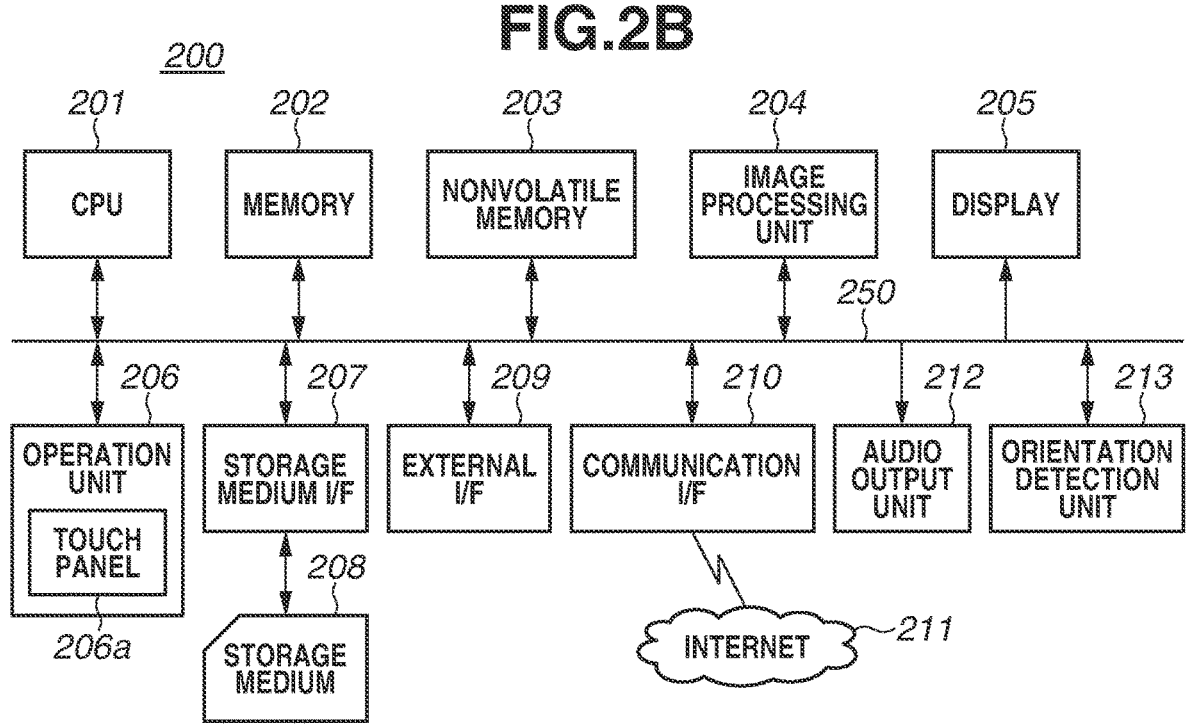
FIG. 2B is a configuration block diagram illustrating the display control apparatus.

FIG. 2B illustrates an example of a configuration of the display control device 200. A central processing unit (CPU) 201, a memory 202, a nonvolatile memory 203, an image processing unit 204, the display 205, the operation unit 206, a storage medium I/F 207, an external I/F 209, and a communication I/F 210 are connected to an internal bus 250. The audio output unit 212 and an orientation detection unit 213 are also connected to the internal bus 250. The units connected to the internal bus 250 can exchange data with each other via the internal bus 250.

The CPU 201 is a control unit for controlling the entire display control device 200. The CPU 201 includes at least one processor or circuit. The memory 202 includes, for example, a RAM (volatile memory using a semiconductor element). The CPU 201 controls various units of the display control device 200, for example, according to programs stored in the nonvolatile memory 203 and by using the memory 202 as a work memory. The nonvolatile memory 203 stores image data, audio data, other data, and various programs for the CPU 201 to operate. For example, the nonvolatile memory 203 is a flash memory or a read-only memory (ROM).

The image processing unit 204 applies various types of image processing to images stored in the nonvolatile memory 203 and a storage medium 208, a video signal obtained via the external I/F 209, and images obtained via the communication I/F 210, based on control of the CPU 201. The image processing performed by the image processing unit 204 includes A/D conversion processing, digital-to-analog (D/A) conversion processing, and encoding processing, compression processing, decoding processing, enlargement/reduction processing (resizing), noise reduction processing, and color conversion processing of image data. The image processing unit 204 also performs various types of image processing, such as panoramic development, mapping processing, and conversion, of a VR image, which may be an omnidirectional image or a non-omnidirectional image of wide field view image including a wide range of video image. The image processing unit 204 may include a dedicated circuit block for applying specific image processing. Depending on the type of image processing, the CPU 201 may perform the image processing according to a program, without using the image processing unit 204.

The display 205 displays images and graphical user interface (GUI) screens constituting a GUI, based on control of the CPU 201. The CPU 201 generates a display control signal according to a program, and controls various parts of the display control device 200 to generate and output a video signal to be displayed on the display 205 to the display 205. The display 205 displays a video image based on the output video signal. The display control device 200 itself may include configurations up to an I/F for outputting the video signal to be displayed on the display 205, and the display 205 may be configured as an external monitor (such as a television set).

The operation unit 206 is an input device for accepting user operations. The input device includes a character information input device such as a keyboard, a pointing device such as a mouse and a touch panel, a button, a dial, a joystick, a touch sensor, and/or a touch pad. The touch panel 206a is an input device that is flatly configured to overlap the display 205 and outputs coordinate information according to a touched position.

The storage medium I/F 207 is configured so that the storage medium 208 such as a memory card, a Compact Disc (CD), and a digital versatile disc (DVD) can be mounted thereon. The storage medium I/F 207 reads data from the mounted storage medium 208 and write data to the storage medium 208 based on control of the CPU 201. The external I/F 209 is an I/F for connecting to an external device by a wired cable or wirelessly and inputting and outputting video signals and audio signals. The communication I/F 210 is an interface for communicating with an external device and the Internet 211 and transmitting and receiving various types of data such as a file and a command. For example, the communication I/F 210 can communicate with an external device via a wireless LAN, a wired LAN, Bluetooth®, and Bluetooth® Low Energy.

The audio output unit 212 outputs the audio of a moving image or music data (audio file), an operation sound, a ring tone, and various notification sounds. The audio output unit 212 includes the audio output terminal 212a to which an earphone is connected, and the speaker 212b. The audio output unit 212 may output audio data to an external speaker by wireless communication.

The orientation detection unit 213 detects the orientation of the display control device 200 with respect to the direction of gravity, and the tilts of the orientation with respect to the yaw, roll, and pitch axes. Whether the display control device 200 is held landscape, held portrait, directed upward, directed downward, or obliquely oriented can be determined based on the orientation detected by the orientation detection unit 213. At least one of an acceleration sensor, a gyro sensor, a geomagnetic sensor, an azimuth sensor, and an altitude sensor can be used as the orientation detection unit 213. A plurality of sensors may be used in combination.

The operation unit 206 includes the touch panel 206a. The CPU 201 can detect the operations described below or states of the touch panel 206a.

That a finger or pen not in touch with the touch panel 206a newly touches the touch panel 206a, i.e., a start of a touch (hereinafter, referred to as a touch-down).

That a finger or pen is in a state of touching the touch panel 206a (hereinafter, referred to as a touch-on).

That a finger or pen moves while remaining in touch with the touch panel 206a (hereinafter, referred to as a touch-move).

That a finger or pen in touch with the touch panel 206a is released from the touch panel 206a, i.e., an end of a touch (hereinafter, referred to as a touch-up).

That nothing is touching the touch panel 206a (hereinafter, referred to as a touch-off).

If a touch-down is detected, a touch-on is also detected at the same time. After a touch-down, a touch-on usually continues being detected unless a touch-up is detected. If a touch-move is detected, a touch-on is also detected at the same time. If a touch-on is detected and the touched position does not move, a touch-move is not detected. A touch-off is detected if a touch-up is detected for all fingers and pens that have been touching.

The CPU 201 is notified of such operations and states and positon coordinates of the finger(s) or pen touching the touch panel 206a via the internal bus 250. The CPU 201 determines what operation (touch operation) is made on the touch panel 206a based on the notified information. For a touch-move, the CPU 201 can determine the moving direction of the finger or pen moving over the touch panel 206a in terms of a vertical component and a horizontal component on the touch panel 206a separately based on changes in the position coordinates. If a touch-move over a predetermined distance or more is detected, a slide operation is determined to be made. An operation of quickly moving a finger in touch with the touch panel 206a for some distance and immediately releasing the finger is referred to as a flick. In other words, a flick is an operation of quickly stroking the touch panel 206a as if flipping the touch panel 206a with a finger. If a touch-move is detected to be made for a predetermined distance or more at a predetermined speed or higher, and a touch-up is immediately detected, a flick can be determined to be made (a flick can be determined to be made subsequent to a slide operation). An operation of simultaneously touching a plurality of positions (e.g., two points) and making the touched positions approach each other is referred to as a pinch-in. An operation of simultaneously touching a plurality of positions (e.g., two points) and separating the touched positions from each other is referred to as a pinch-out. A pinch-out and a pinch-in are collectively referred to as a pinch operation (or simply as a pinch). Any one of various methods of touch panels, including a resistive, capacitive, surface wave, infrared, electromagnetic induction, image recognition, and optical sensor touch panels, may be used as the touch panel 206a. Some methods detect that a touch is made if the touch panel is contacted. Some methods detect that a touch is made if a finger or pen approaches the touch panel. Any of such methods may be used.

Figure 2C:
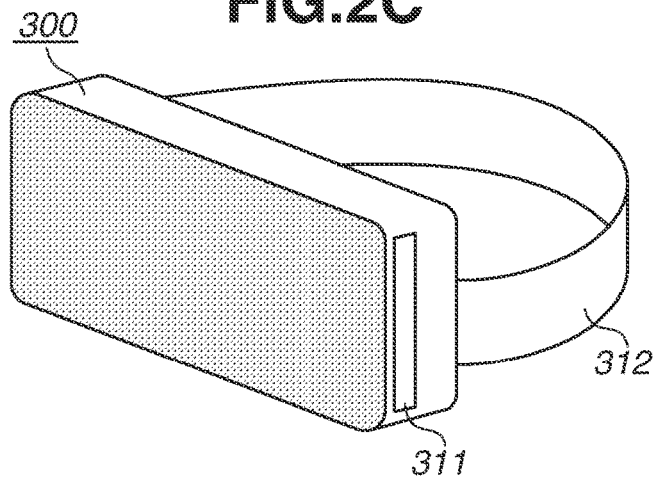
FIG. 2C is a diagram illustrating an external view of virtual reality (VR) goggles to which the display control apparatus can be attached.

FIG. 2C illustrates an external view of VR goggles 300 (head mount adapter) to which the display control device 200 can be attached. If attached to the VR goggles 300, the display control device 200 can be used as an HMD. An insertion slot 311 is for inserting the display control device 200 therein. The entire display control device 200 can be inserted into the VR goggles 300 with the display surface of the display 205 directing toward a head band 312 for fixing the VR goggles 300 to the head of the user (i.e., toward the user). If the user wears, on the head, the VR goggles 300 to which the display control device 200 is attached, the user can visually observe the display 205 of the display control device 200 without holding the display control device 200 by hand. If the user moves the user's head or entire body in such a state, the orientation of the display control device 200 also changes. For VR display, the orientation detection unit 213 detects the change in the orientation of the display control device 200, and the CPU 201 performs VR display processing based on the change in orientation. That the orientation detection unit 213 detects the orientation of the display control device 200 is equivalent to that the orientation detection unit 213 detects the orientation of the user's head (direction in which the line of sight of the user is directed). The display control device 200 itself may be an HMD that can be mounted on the head without the VR goggles 300.

The display control device 200 can display a VR image on which a zenith correction (correction of pitch and roll angles) has been performed by the image processing unit 204. The display control device 200 can display a VR image with or without the zenith correction.

Figure 3A:
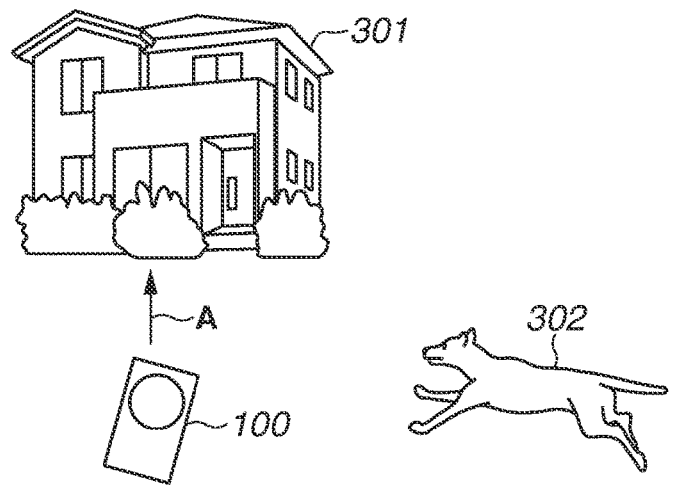
FIGS. 3A to 3C are schematic diagrams illustrating a case where a zenith correction is performed and a case where the zenith correction is not performed.

The zenith correction in displaying a VR image will be described with reference to FIGS. 3A to 3C. FIG. 3A is a schematic diagram illustrating an imaging situation. An omnidirectional image is captured with the digital camera 100 installed in the illustrated positional relationship between a house 301 and a dog 302 which are objects. In the illustrated positional relationship, the house 301 is in a direction A (for example, to the north) as seen from the digital camera 100. The dog 302 is in a direction 90° to the right from the direction A (for example, to the east) as seen from the digital camera 100. Suppose that the digital camera 100 is held with a slight tilt to the right with respect to the direction of gravity, so that the direction of gravity and the vertical axis of the digital camera 100 are not parallel. In such a situation, a VR image (moving image or still image) is captured with the front (the barrier 102a and the imaging unit 22a) of the digital camera 100 toward the house 301, and an image A is recorded.

Figure 3B:
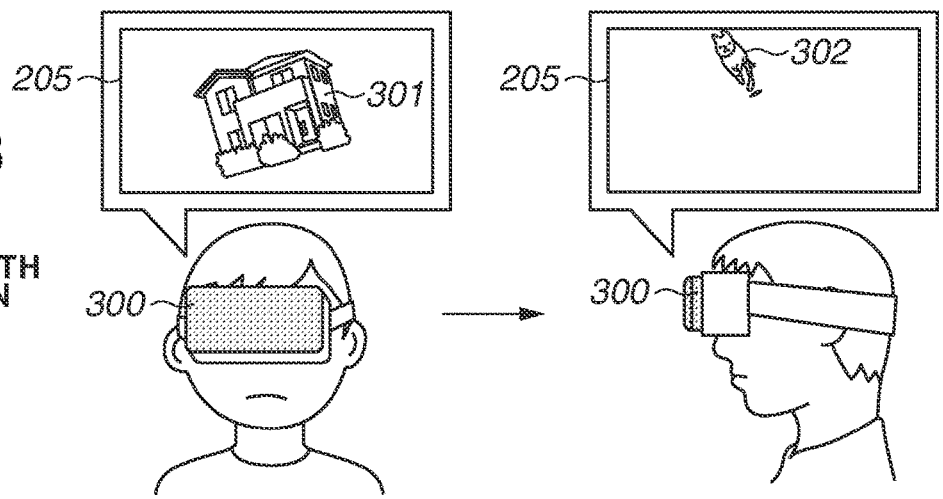

FIG. 3B is a schematic diagram illustrating a case where the image A captured in the situation illustrated in FIG. 3A is reproduced and displayed by the display control device 200 without the zenith correction. The display control device 200 obtains the image A (image acquisition) by a wireless or wired file transfer from the recording medium 90 of the digital camera 100 or by loading the recording medium 90, like a memory card, into the display control device 200. FIG. 3B illustrates an example where the playback method is a VR display (VR view). In the left half of FIG. 3B, the user wears the VR goggles 300 on the head and views the image A by a VR display. To the VR goggles 300, the display control device 200 is attached. The image A is an image captured with the digital camera 100 tilted. Without the zenith correction, a video image tilted to a side opposite to the tilt of the digital camera 100 is displayed. That is, without the zenith correction, the image A is displayed in a direction such that the house 301 is tilted. More specifically, in the case of a display method other than a VR display, the image A is displayed in a direction such that the vertical direction of the digital camera 100 during imaging in the tilted state with respect to the direction of gravity is parallel to the vertical direction of the display 205 of the display control device 200 which is the playback apparatus. In the case of a VR display, the image A is reproduced and displayed in a direction such that the vertical direction of the digital camera 100 during imaging is parallel to the direction of gravity (axial direction through the zenith) detected by the orientation detection unit 213 of the display control device 200 which is the playback apparatus. The right half of FIG. 3B illustrates a display example of the display 205 in a case where the user turns to the right from the state in the left half of FIG. 3B. The display range (direction) of the image A is changed based on the change in the orientation of the user turning to the right, detected by the orientation detection unit 213, and the image A is displayed in a direction such that the dog 302 appears. In such a situation, the dog 302 is also displayed with a tilt. Since the display range is changed by a rotational movement about the vertical direction of the digital camera 100 during imaging, the video image of the dog 302, which is actually supposed to be seen at a similar height to that of the house 301, appears at a vertically shifted position.

Figure 3C:
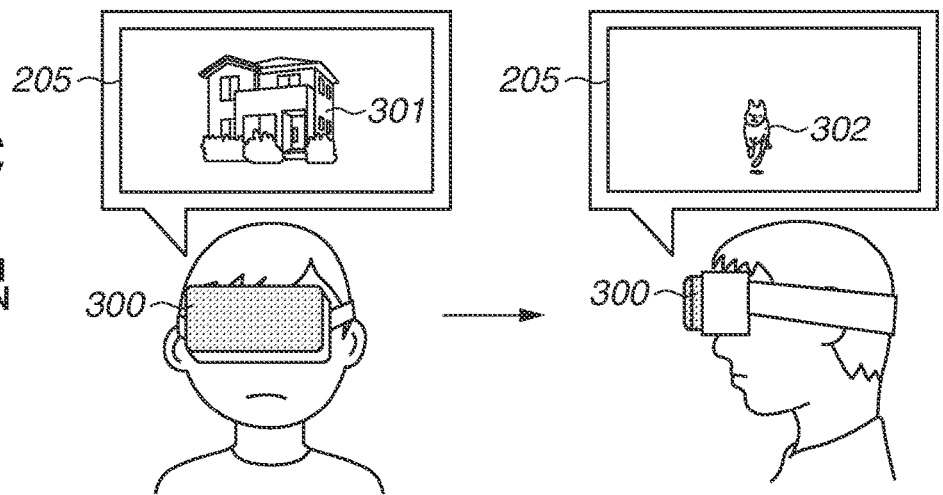

FIG. 3C is a schematic diagram illustrating a case where the image A captured in the situation of FIG. 3A is reproduced and displayed by the display control device 200 with the zenith correction. FIG. 3C also illustrates an example where the playback method is a VR display (VR view). In the left half of FIG. 3C, the user wears the VR goggles 300 on the head and views the image A by a VR display. To the VR goggles 300, the display control device 200 is attached. The image A is an image captured with the digital camera 100 tilted. With the zenith correction, the image A is corrected in direction and displayed so that the direction of gravity detected by the digital camera 100 in capturing the image A is parallel to the vertical direction during playback. That is, with the zenith correction, the image A is displayed in a direction such that the house 301 is not tilted. More specifically, in the case of a display method other than a VR display, the image A is displayed in a direction such that the direction of gravity detected by the digital camera 100 in capturing the image A is parallel to the vertical direction of the display 205 of the display control device 200 which is the playback apparatus. In the case of a VR display, the image A is reproduced and displayed in a direction such that the direction of gravity detected by the digital camera 100 during imaging is parallel to the direction of gravity (axial direction along the zenith) detected by the orientation detection unit 213 of the display control device 200 which is the playback apparatus. In either case, the direction of display is corrected to cancel out the amount of difference between the vertical direction of the digital camera 100 during imaging in the tilted state with respect to the direction of gravity (axial direction along the zenith) and the direction of gravity detected by the digital camera 100 in capturing the image A. The right half of FIG. 3C illustrates a display example of the display 205 in a case where the user turns to the right from the state in the left half of FIG. 3C. The display range (direction) of the image A is changed based on the change in the orientation of the user turning to the right, detected by the orientation detection unit 213, and the image A is displayed in a direction such that the dog 302 appears. In such a situation, the dog 302 is also displayed without a tilt. As in the actual situation of the objects, the dog 302 appears at a similar height to that of the house 301.

Figure 4C:
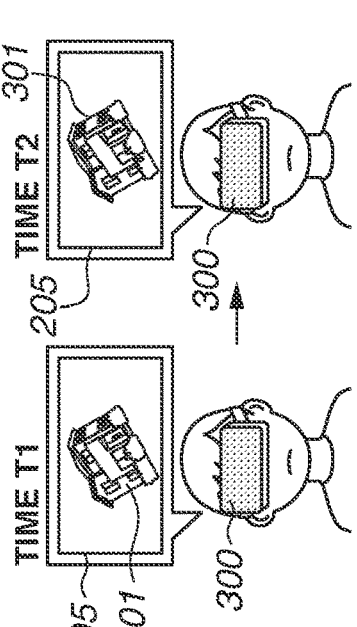
FIGS. 4A to 4E are schematic diagrams illustrating first to fourth display methods based on combinations of the zenith correction and a yaw angle correction.
Figure 4E:
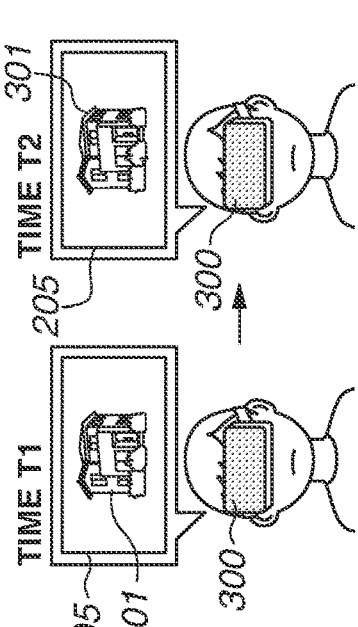
Figure 4B:
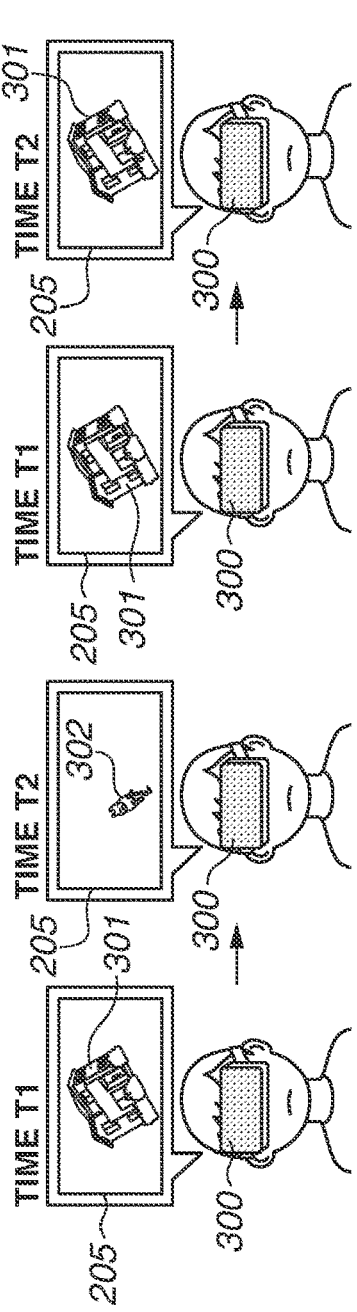
Figure 4D:
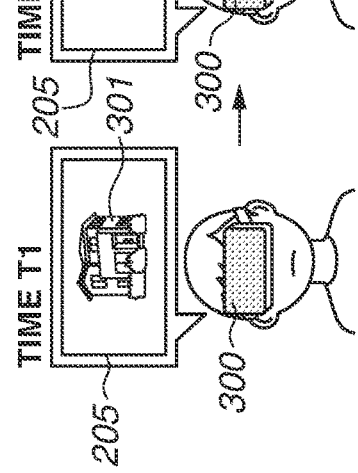
Figure 4A:
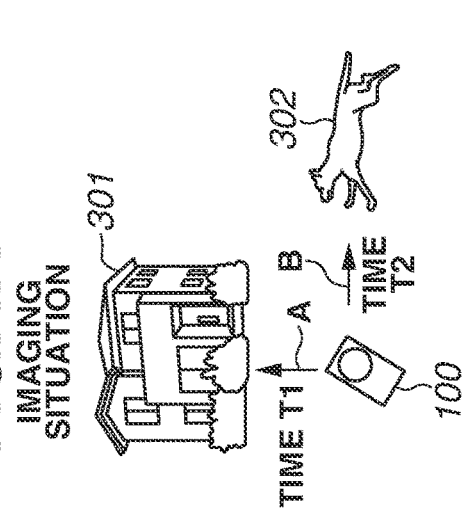

The display control device 200 can display a VR image with a yaw angle correction by the image processing unit 204. The yaw angle correction refers to a correction to the direction of rotation with the vertical direction of the digital camera 100 as the rotation axis. In other words, the yaw angle correction is a correction to the direction of display within a horizontal plane (equivalent to an azimuth correction if the vertical direction of the VR image is parallel to the direction of gravity). The display control device 200 can display a VR image with or without the yaw angle correction. The yaw angle correction and the zenith correction can be performed in combination. Specifically, concerning the zenith correction and the yaw angle correction, the display control device 200 is capable of the following four types of display:

First display method: performs both the zenith correction and the yaw angle correction
Second display method: performs the zenith correction but not the yaw angle correction
Third display method: performs the yaw angle correction but not the zenith angle correction
Fourth display method: performs neither of the zenith correction and the yaw angle correction The foregoing first to fourth display methods based on the combinations of the zenith correction and the yaw angle correction will be described with reference to FIGS. 4A to 4E. FIG. 4A is a schematic diagram illustrating an imaging situation. The positional relationship between the house 301 and the dog 302, which are objects, and the digital camera 100 and the tilt of the digital camera 100 with respect to the direction of gravity are similar to those in FIG. 3A. An example of capturing an omnidirectional moving image B by the digital camera 100 will be described with reference to FIG. 4A. At time T1 in the middle of recording the moving image B, the front of the digital camera 100 is directed to the direction A (toward the house 301). Then, immediately before time T2 in the middle of recording the same moving image B, the imaging direction is changed so that the front of the digital camera 100 faces a direction B (toward the dog 302).

FIG. 4B is a schematic diagram illustrating a case where the moving image B captured in the situation of FIG. 4A is reproduced and displayed by the display control device 200 without the zenith correction or the yaw angle correction (reproduced and displayed by the fourth display method). In the left half of FIG. 4B, the user is viewing a playback point corresponding to time T1 in the moving image B. The moving image B is an image captured with the digital camera 100 tilted. Without the zenith correction, a video image tilted to a side opposite to the tilt of the digital camera 100 is thus displayed on the display 205. In other words, the moving image B is displayed in a direction such that the house 301 is tilted. The right half of FIG. 4B is a schematic diagram illustrating a case where the playback of the moving image B has progressed from the state in the left half of FIG. 4B up to a point corresponding to time T2. The user has not changed the viewing direction or changed the display range by a touch operation. Without the yaw angle correction, a different display range appears due to the change in the direction of the digital camera 100 during imaging. More specifically, as the playback of the moving image B progresses, the video image changes so that the house 301 is seen (the video image in the direction A is seen) at the playback point corresponding to time T1 and the dog 302 is seen instead of the house 301 (the video image in the direction B is seen) at the playback point corresponding to time T2. Since the display range to be seen changes without the viewing user making a change in orientation or an operation to change the viewing direction (display range), the sense of immersion can sometimes be impaired. Without the zenith correction, the dog 302 also appears tilted.

FIG. 4C is a schematic diagram illustrating a case where the moving image B captured in the situation of FIG. 4A is reproduced and displayed by the display control device 200 without the zenith correction and with the yaw angle correction (reproduced and displayed by the third display method). In the left half of FIG. 4C, the user is viewing the playback point corresponding to time T1 in the moving image B. The moving image B is an image captured with the digital camera 100 tilted. Without the zenith correction, a video image tilted to a side opposite to the tilt of the digital camera 100 is thus displayed on the display 205. In other words, the moving image B is displayed in a direction such that the house 301 is tilted. The right half of FIG. 4C is a schematic diagram illustrating a case where the playback of the moving image B has progressed from the state in the left half of FIG. 4C up to the point corresponding to time T2. By the yaw angle correction, the direction of the video image is corrected to cancel out the movement in the yaw angle of the digital camera 100 during imaging (movement in the direction of rotation about the vertical direction of the digital camera 100). Since FIG. 4C illustrates a display example in the case where the yaw angle correction is performed, the rotation in the yaw angle of the digital camera 100 during imaging, occurring in the period from time T1 to time T2, is corrected to be cancelled out. In the right half of FIG. 4C, a video image in a direction such that the same house 301 as in the left half of FIG. 4C is seen is thus displayed (the video image in the direction A is displayed). More specifically, although the direction of the digital camera 100 changes with the progress of the playback of the moving image B, the house 301 is seen (the video image in the direction A is seen) at the playback point corresponding to time T1 and the house 301 is seen (the video image in the direction A is seen) at the playback point corresponding to time T2 as well. This can avoid a sense of strangeness that the direction of display changes although the user does not change the viewing direction or change the display range by a touch operation. Without the zenith correction, the house 301 also appears tilted at time T2.

FIG. 4D is a schematic diagram illustrating a case where the moving image B captured in the situation of FIG. 4A is reproduced and displayed by the display control device 200 with the zenith correction and without the yaw angle correction (second display method). In the left half of FIG. 4D, the user is viewing the playback point corresponding to time T1 in the moving image B. The moving image B is an image captured with the digital camera 100 tilted. With the zenith correction, a not-tilted video image is displayed. In other words, the moving image B is displayed in a direction such that the house 301 is not tilted. The right half of FIG. 4D is a schematic diagram illustrating a case where the playback of the moving image B has progressed from the state in the left half of FIG. 4D up to the point corresponding to time T2. Without the yaw angle correction, a different display range is seen although the user has not changed the viewing direction or changed the display range by a touch operation. Specifically, as the playback of the moving image B progresses, the video image changes so that the house 301 is seen (the video image in the direction A is seen) at the playback point corresponding to time T1 and the dog 302 is seen instead of the house 301 (the video image in the direction B is seen) at the playback point corresponding to time T2. As in FIG. 4A, since the display range to be seen changes without the viewing user making a change in orientation or an operation to change the viewing direction (display area), the sense of immersion can sometimes be impaired. With the zenith correction, the dog 302 appears with no tilt.

FIG. 4E is a schematic diagram illustrating a case where the moving image B captured in the situation of FIG. 4A is reproduced and displayed by the display control device 200 with both the zenith correction and the yaw angle correction (first display method). In the left half of FIG. 4E, the user is viewing the playback point corresponding to time T1 in the moving image B. The moving image B is an image captured with the digital camera 100 tilted. With the zenith correction, a not-tilted video image is displayed. In other words, the moving image B is displayed in a direction such that the house 301 is not tilted. The right half of FIG. 4E is a schematic diagram illustrating a case where the playback of the moving image B has progressed from the state in the left half of FIG. 4E up to the point corresponding to time T2. With the yaw angle correction, the rotation in the yaw angle of the digital camera 100 during imaging, occurring in the period from time T1 to time T2, is corrected to be cancelled out. In the right half of FIG. 4E, a video image in a direction such that the same house 301 as in the left half of FIG. 4E is seen is thus displayed (the video image in the direction A is displayed). This can avoid a sense of strangeness that the direction of display changes although the user does not change the viewing direction or change the display range by a touch operation. With the zenith correction, the house 301 also appears with no tilt at time T2.

The display control device 200 adaptively uses the foregoing first to fourth display methods based on the following conditions.

(1) Use Different Display Methods Based on User Setting About Playback Method (Display Method)

A setting item that is set by the user in advance to set which of the first to fourth display methods to be used (manual setting of the display method), and the display control device 200 displays a VR image by the display method based on the setting. The display control device 200 can thus display the VR image by a display method desired by the user. Whether the display method is a VR view or a different one can be set based on user operations. In the case of a VR view, the first display method is used. The reason is that a VR view is characteristically a display method of changing the display range based on a change in the orientation of the display control device 200 which is caused by the user, and priority is appropriately given to the sense of immersion of the viewing user in particular. In other words, the user during playback is considered to have the initiative in determining the viewing direction of the VR image rather than the user during imaging.

(2) Use Different Display Methods Based on Setting Information During Imaging

If a setting about an installation position for the digital camera 100 has been set and the setting is recorded as attribute information (metadata) in association with the VR image during imaging, the display control device 200 determines the display method based on the attribute information.

If the installation position is not specified, a selfie stick, or a handheld position, the first display method is used. If the VR image is captured with the digital camera 100 attached to a selfie stick, the digital camera 100 is often held away from the user's body so that the user is appropriately captured within the imaging range of the digital camera 100. The digital camera 100 is attached to one end of the selfie stick, and the user holds the other end of the selfie stick and adjusts the orientation of the digital camera 100. Where the front of the digital camera 100 is directed and which direction the digital camera 100 is held in with respect to the direction of gravity are therefore difficult to adjust. In addition, since the digital camera 100 is an omnidirectional camera, the user thinks that he/she can be appropriately captured by just holding the digital camera 100 some distance away from himself/herself without being aware of the front of the digital camera 100. During the imaging by the omnidirectional camera using a selfie stick, the user is therefore likely to be unaware of where the front side of the digital camera 100 is directed and which direction the digital camera 100 is held in with respect to the direction of gravity. The VR image is therefore likely to be difficult to view if displayed without correction. For such a reason, the VR image is displayed by the first display method of correcting both the zenith and the yaw angle, so that the VR image can be appropriately viewed even if the VR image is an image obtained by imaging without awareness of the front direction of the digital camera 100 or the tilt of the digital camera 100. In the case of handheld imaging, the VR image is also displayed by the first display method since the front direction of the digital camera 100 and the tilt of the digital camera 100 are likely to be in the way not intended by the user.

If the installation position is set so that the digital camera 100 is fixed to a bicycle, a car, a ski, a snowboard, or a surfboard, the second display method of performing the zenith correction and not correcting the yaw angle is used. In such installation positions, the digital camera 100 travels with the user's attention forward, and the traveling direction can change in the course of traveling. In an omnidirectional moving image including such a traveling video image, attention is paid on the traveling direction. The traveling direction looks unnatural if not appearing in a constant direction (in front of the viewing user during playback). The yaw angle correction is therefore not performed so that if the traveling direction changes in the middle of the moving image, the changed traveling direction appears in the constant direction (in front of the viewing user during playback). This can give the user viewing the reproduced moving image a sense of immersion as if he/she is on the vehicle on which the digital camera 100 is installed.

If the installation position is a flying object, such as a drone (unmanned aircraft), the third display method of correcting the yaw angle and not correcting the zenith is used. This enables the viewer during playback to view the VR image in an arbitrary direction regardless of the front direction of the digital camera 100 during imaging. On the other hand, tilts in the roll angle and the pitch angle during a turn or when the flying object is swayed by wind are reproduced. The viewer can thus get a sense of presence as if he/she is actually on the flying object. The third display method may also be selected if the installation position is a ship, a hang glider, or equipment used during skydiving or on a descending parachute.

If the installation position is a helmet or a roller coaster, the fourth display method of correcting neither the zenith nor the yaw angle is used. Without the zenith correction or the yaw angle correction, the imaging situation of the imaging apparatus is faithfully reproduced and the viewer can vicariously experience the imaging situation. For example, if a moving image captured with the digital camera 100 attached to the helmet of the user riding a roller coaster is viewed by a VR display, an upside-down video image can be seen when the roller coaster loops vertically. Tilts and traveling directions at curves are also reproduced. This can give the viewer a sense of immersion or a sense of presence as if he/she is actually riding the roller coaster. If the digital camera 100 is installed on a traveling vehicle or device, such as an athletic device that loops, or on the helmet of the player, and priority is given to a sense of presence that enables vicarious experience of the player, the fourth display method can be used instead of the second display method. Examples of such an athletic game include mogul skiing, aerial skiing, big air snowboarding, half pipe snowboarding, and freestyle motocross.

(3) Use Different Display Methods Based on Moving Speed of Digital Camera During Imaging If the digital camera 100 capturing the VR image can be determined to be moving at or above a certain speed during imaging, the second display method is used. The reason is similar to that described for the foregoing condition (2). If the digital camera 100 is moving at a speed faster than walking, the digital camera 100 is considered to be traveling with the user's attention forward. This is also applicable if information about the setting of the installation position is not available. On the other hand, if the moving speed of the digital camera 100 capturing the VR image is determined to be lower than a certain speed during imaging, the first display method is used. The moving speed of the digital camera 100 may be one obtained by a motion sensor, such as an acceleration sensor included in the digital camera 100 capturing the VR image, or one obtained by a position measurement sensor such as a Global Positioning System (GPS) sensor. The moving speed of the digital camera 100 may be one obtained from correlation between previous and subsequent frames by analyzing the moving image.

(4) Use Different Display Methods Based on Magnitude of Vibration of Digital Camera If the digital camera 100 capturing the VR image can be determined to be vibrating (shaking) to some extent during imaging, the second display method is used. The reason is that if the vibrations are large, the digital camera 100 can be moving instead of being stationary and fixed. The reason why the second display method is employed in the moving case is as described for the condition (2). Such a condition is also applicable if the moving speed of the digital camera 100 during imaging is not available. On the other hand, if the vibrations of the digital camera 100 during imaging are small, the first display method is used.

(5) Use Different Display Methods Based on Result of Analysis of Video Image

If an LV image obtained in an imaging standby state or a recorded moving image is analyzed and found to include an object that is stationary relative to the digital camera 100 and is greater than or equal to a predetermined area, the second display method is used. The relatively stationary object greater than or equal to a predetermined area (stationary object) is likely to be a device to which the digital camera 100 is fixed during imaging (such as a vehicle handle, a car hood, and a tip of a ski). If such a stationary object is included in the VR moving image and the imaging direction changes in the middle of the VR moving image, the stationary object remains visible to the viewer. The viewer then finds that the imaging direction is changed not because of a change in the display range of the video image but because of a change in the direction of the stationary object itself during imaging. Such a change is therefore less likely to be an obstacle to the sense of immersion as described above in FIG. 4D. In such cases, the digital camera 100 is also likely to be installed on a traveling vehicle.

Figure 5:
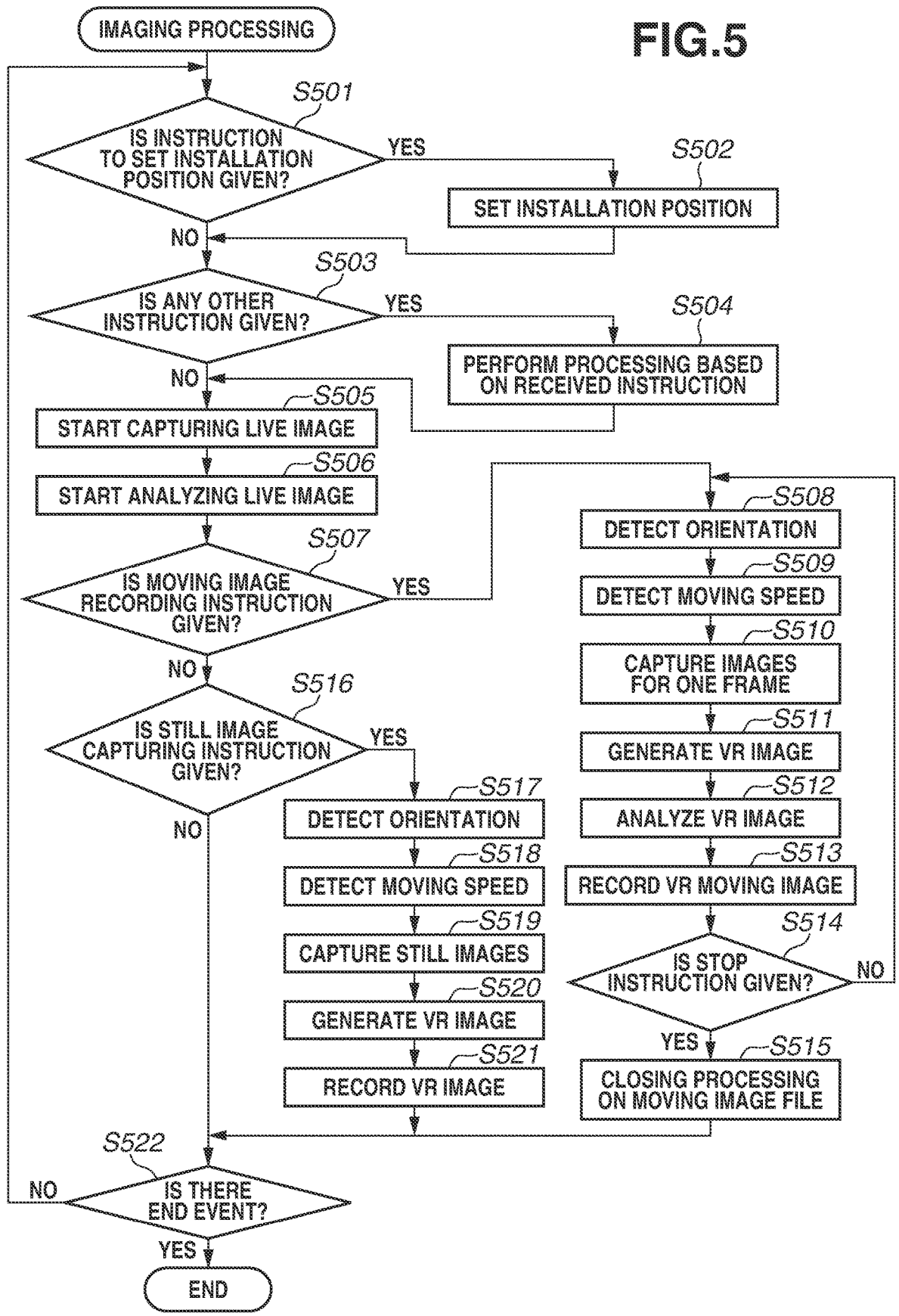
FIG. 5 is a flowchart illustrating imaging processing.

FIG. 5 is a flowchart illustrating imaging processing (imaging processing 1) on a VR image by the digital camera 100. This processing is implemented by loading a program recorded in the nonvolatile memory 56 into the system memory 52 and executing the program by the system control unit 50. The processing illustrated in FIG. 5 is started if the digital camera 100 is switched to an imaging mode and activated in an imaging standby state.

In step S501, the system control unit 50 determines whether an instruction to set an installation position is given. The user can give the instruction to set an installation position by operating the operation unit 70 while viewing a setting screen displayed on the display unit 28, or by operating an external device (for example, the display control device 200) wirelessly connected to the digital camera 100 while viewing a setting screen displayed on the external device. FIG. 6A illustrates a display example of an installation position setting screen displayed on the display 205 of the display control device 200 connected to the digital camera 100 during imaging standby. Displayed options that can be set as the installation position include: not specified, a handheld position, a tripod, a selfie stick, a helmet, body worn, a bicycle/ski/snowboard, and a car. Options such as a drone, a roller coaster, a motorcycle, and the ceiling are further displayed by scrolling down. The user can select and set any one of the options as an installation position. Such installation position candidates are just examples. Fewer or more installation position candidates may be provided. In a case where an instruction to set an installation position is given (YES in step S501), the processing proceeds to step S502. If not (NO in step S501), the processing proceeds to step S503.

In step S502, the system control unit 50 sets and stores the instructed installation position into the nonvolatile memory 56 based on the instruction, received in step S501, to set the installation position.

In step S503, the system control unit 50 determines whether any other instruction is given. The system control unit 50 can receive setting instructions about imaging conditions (a shutter speed, an aperture, white balance, a self-timer setting, switching between moving image recording and still image capturing, the number of pixels, a compression rate, and a file format) as other instructions. If any other instruction is given (YES in step S503), the processing proceeds to step S504. If not (NO in step S503), the processing proceeds to step S505. In step S504, the system control unit 50 performs processing based on the received instruction.

In step S505, the system control unit 50 starts capturing a live image (LV image) by the imaging units 22a and 22b. If an external device (for example, the display control device 200) is connected, the system control unit 50 starts outputting the live image to the external device via the connection I/F 25. As a result, the LV image of the VR image being captured is displayed on the display unit of the external device (for example, the display 205 of the display control device 200).

In step S506, the system control unit 50 starts analyzing the captured live image using the image processing unit 24. The system control unit 50 records movement information, vibration information, and stationary object information into the system memory 52 based on the analysis result.

The movement information is obtained in the following manner. The system control unit 50 analyzes correlation (difference) between frames of the live image, and determines whether the digital camera 100 is moving at a predetermined speed or higher. For example, an image in a traveling direction includes image feature points radially moving from a vanishing point on an extension of the traveling direction. If the analysis result shows such movement, the digital camera 100 is found to be moving toward the vanishing point on the extension of the traveling direction. The moving speed then can be determined from the movement vectors of the feature points. The system control unit 50 stores movement information that is obtained as a result of the analysis and indicates the moving speed of the digital camera 100 or indicates whether the digital camera 100 is moving at a predetermined speed or higher into the system memory 52. When capturing and recording a still image or moving image afterward, the system control unit 50 stores the movement information as attribute information (metadata) about each frame of the image file.

The vibration information is obtained in the following manner. The system control unit 50 can analyze the correlation (difference) between the frames of the live image, determine whether the digital camera 100 is vibrating, and record vibration information indicating how much the digital camera 100 is vibrating. For example, if the analysis result shows that almost all feature points are moving in the same direction, the digital camera 100 itself is found to be vibrating (shaking). The amount of vibrations can be determined from the magnitudes of the movement vectors of the feature points.

The stationary object information is obtained in the following manner. The system control unit 50 analyzes a predetermined duration (for example, three seconds) of a plurality of frames of live image. If the same feature points continue to be at the same positions over a plurality of frames for a predetermined time, an object being stationary relative to the digital camera 100 can be assumed to be present with respect to the digital camera 100. If the ratio of the area of portions that can be considered to be continuous with the stationary object to the entire VR image is higher than or equal to a threshold, the system control unit 50 records stationary object information indicating that there is a stationary object greater than or equal to a predetermined area into the system memory 52.

In step S507, the system control unit 50 determines whether a moving image recording instruction to start capturing a moving image (recording a moving image) is given. For example, if the shutter button 61 is pressed in a state where the moving image capturing mode is set by the mode change switch 60, the system control unit 50 determines that a moving image recording instruction is given (YES in step S507). The determination is also YES if a moving image recording instruction is given from the external device side during a remote LV display. If a moving image recording instruction is given (YES in step S507), the processing proceeds to step S508. If not (NO in step S507), the processing proceeds to step S516.

In step S508, the system control unit 50 detects the orientation of the digital camera 100 with respect to the direction of gravity by the orientation detection unit 55. The system control unit 50 stores the orientation into the system memory 52 as orientation information about the next frame of the VR moving image to be recorded. The system control unit 50 determines whether there are vibrations greater than or equal to a threshold (whether there are vibrations satisfying a predetermined condition) based on the output of the orientation detection unit 55, and records vibration information indicating the amount of detected vibrations into the system memory 52. In step S513 to be described below, the system control unit 50 records such pieces of information as attribute information (metadata) in association with the frame of the VR moving image.

In step S509, the system control unit 50 detects the moving speed of the digital camera 100 based on the output of the orientation detection unit 55 and/or a position measurement sensor (not illustrated). The moving speed is not limited to that detected within one frame period, and is detected also based on information obtained from several frames before (for example, if immediately after a start of recording, the information analyzed in step S506 immediately before the start of recording) as well. The system control unit 50 records the movement information indicating the detected moving speed into the system memory 52. In step S513 to be described below, the system control unit 50 records the movement information as attribute information (metadata) in association with the frame of the VR moving image.

In step S510, the system control unit 50 captures images for one frame using the imaging units 22*a* and 22*b*, and stores the images into the memory 32.

In step S511, the system control unit 50 applies the foregoing connection image processing to the captured images stored in the memory 32 to generate a single VR image using the image processing unit 24, and stores the VR image into the memory 32.

In step S512, like step S506, the system control unit 50 analyzes the VR image obtained in step S511, and records movement information, vibration information, and stationary object information depending on the situation. The analysis here is not limited to information obtained within one frame period, and is performed also based on information obtained from several frames before (for example, if immediately after a start of recording, the information analyzed in step S506 immediately before the start of recording) as well.

In step S513, the system control unit 50 records the VR image stored in the memory 32 as one frame of the VR moving image onto the recording medium 90 in the form of a moving image file. Attribute information (metadata) that indicates that the moving image is a VR image and that can be used afterward to determine the availability of a VR view is also attached to the moving image file. The orientation information, the movement information, the vibration information, and the stationary object information recorded in the system memory 52 as the information about the frame to be recorded here are also recorded as attribute information (metadata) about the frame recorded in step S513, in association with the moving image file. Setting information (installation position information) about the installation position, if any, recorded in the nonvolatile memory 56 is also recorded as attribute information (metadata) about the frame recorded in step S513, in association with the moving image file. The installation position information may be recorded as information in units of a moving image file, not as frame-by-frame information.

In step S514, the system control unit 50 determines whether a stop instruction for the recording of the moving image is given. If a stop instruction for the recording of the moving image is given (YES in step S514), the processing proceeds to step S515. If no stop instruction is given (NO in step S514), the processing returns to step S508. In step S508, the system control unit 50 performs processing for the next frame.

In step S515, the system control unit 50 performs closing processing on the moving image file recorded on the recording medium 90.

In step S516, the system control unit 50 determines whether a still image capturing instruction to capture a still image is given. For example, if the shutter button 61 is pressed in a state where the still image capturing mode is set by the mode change switch 60, the system control unit 50 determines that a still image capturing instruction is given (YES in step S516). The determination is also YES if a still image capturing instruction is given from the external device during a remote LV display. If a still image capturing instruction is given (YES in step S516), the processing proceeds to step S517. If not (NO in step S516), the processing proceeds to step S522.

In step S517, the system control unit 50 detects the orientation of the digital camera 100 with respect to the direction of gravity by the orientation detection unit 55. The system control unit 50 stores the orientation into the system memory 52 as orientation information about the still image to be recorded. The system control unit 50 also determines whether there are vibrations greater than or equal to a threshold based on the output of the orientation detection unit 55. The system control unit 50 records vibration information indicating the amount of detected vibrations into the system memory 52. In step S521 to be described below, such pieces of information are recorded as attribute information in association with a VR image that is a still image.

In step S518, the system control unit 50 detects the moving speed of the digital camera 100 based on the output of the orientation detection unit 55 and/or the position measurement sensor (not illustrated). The moving speed is not limited to that detected within one frame period, and is detected also based on information obtained from several frames before (for example, if immediately after a start of recording, the information analyzed in step S506 immediately before the start of recording) as well. The system control unit 50 records the moving information indicating the detected moving speed into the system memory 52. In step S521 to be described below, the movement information is recorded as attribute information in association with the VR image that is a still image.

In step S519, the system control unit 50 captures still images using the imaging units 22a and 22b, and stores the still images into the memory 32.

In step S520, the system control unit 50 applies the foregoing connection image processing to the captured images stored in the memory 32 to generate a single VR image using the image processing unit 24, and stores the VR image into the memory 32.

In step S521, the system control unit 50 records the VR image stored in the memory 32 as a VR image that is a still image onto the recording medium 90 in the form of a still image file. Attribute information (metadata) that indicates that the still image is a VR image and that can be used afterward to determine the availability of a VR view is also attached to the still image file. The orientation information, the movement information, and the vibration information recorded in the system memory 52 as the attribute information about the still image file to be recorded here are also recorded as attribute information (metadata) in association with the still image file. The setting information (installation position information) about the installation position, if any, recorded in the nonvolatile memory 56 is also recorded in association with the still image file.

In step S522, the system control unit 50 determines whether there is an end event, such as power-off and a shift instruction to an operation mode other than the imaging modes. If there is no end event (NO in step S522), the processing returns to step S501 to repeat. If there is an end event (YES in step S522), the imaging processing ends.

Figure 7:
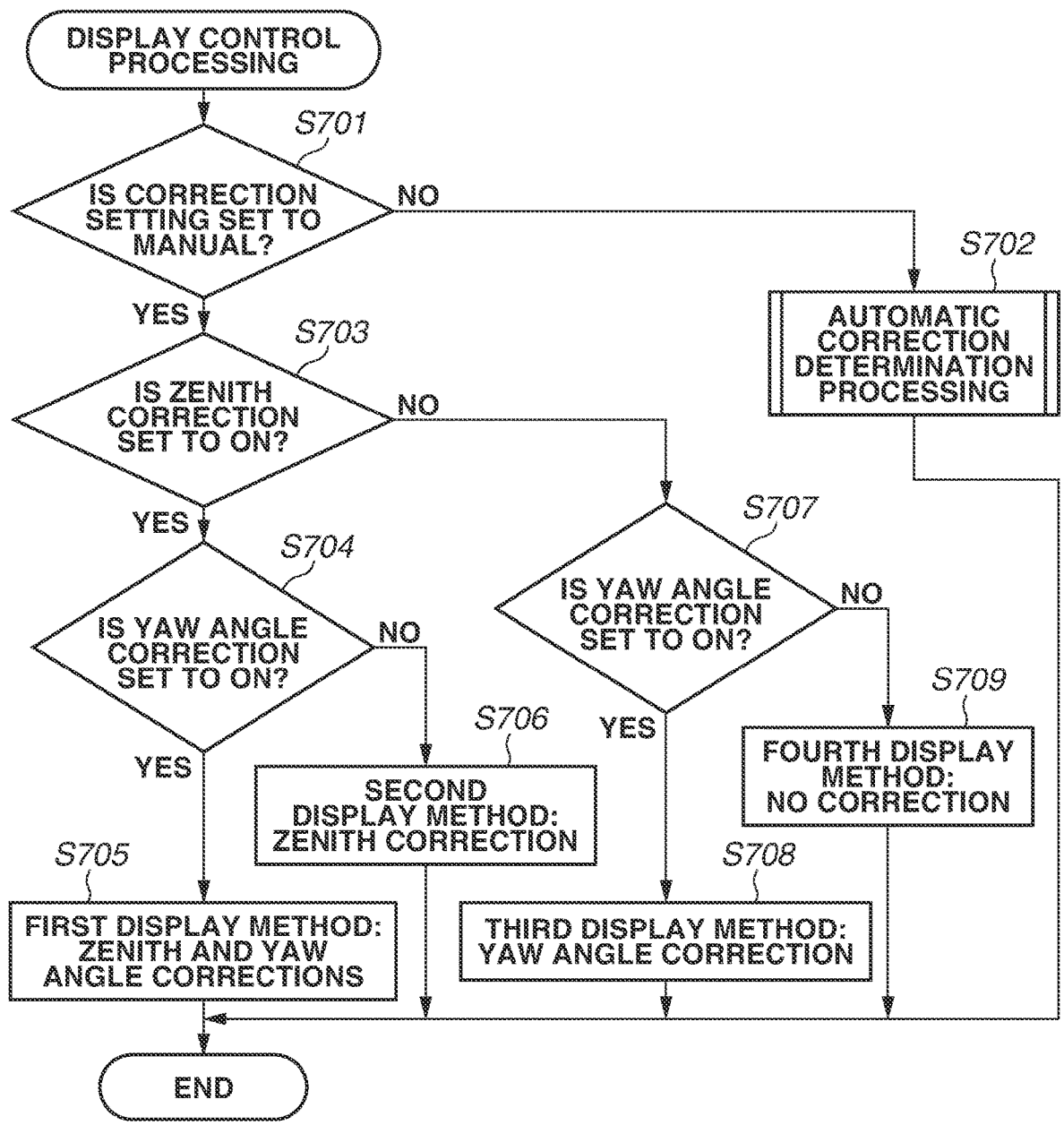
FIG. 7 is a flowchart illustrating display control processing.

In such a manner, a VR image to be reproduced by playback processing (display control processing) to be described below is recorded. The VR image recorded on the recording medium 90 can be displayed on the display control device 200 by loading the recording medium 90 into the display control device 200 or by transferring the VR image to the display control device 200 in a wireless or wired manner FIG. 7 illustrates a flowchart of the display control processing of a VR image by the display control device 200. This processing is implemented by the CPU 201 loading and executing a program recorded in the nonvolatile memory 203 using the memory 202 as a work memory. The processing of FIG. 7 is started if a VR image is selected from images listed on the display 205 and an instruction to reproduce and display the VR image is given.

In step S701, the CPU 201 refers to the nonvolatile memory 203 and determines whether a correction setting is set to manual. If the correction setting is not set to manual, i.e., is set to automatic (NO in step S701), the processing proceeds to step S702. If the correction setting is set to manual (YES in step S701), the processing proceeds to step S703. The correction setting is a setting that is related to the zenith correction and the yaw angle correction on the VR image, set in advance based on user operations, and recorded in the nonvolatile memory 203. In making the correction setting, a correction setting screen such as illustrated in FIG. 6B is displayed on the display 205. The user can select either automatic or manual on the correction setting screen. If manual is selected, whether to turn on or off each of the zenith correction and the yaw angle correction can be separately selected. After the selection operations by the user, the CPU 201 records the selections as the correction setting into the nonvolatile memory 203.

In step S702, the CPU 201 performs automatic correction determination processing. The automatic correction determination processing is processing for automatically selecting any one of the first to fourth display methods based on conditions and displaying the VR image. Details of the automatic correction determination processing will be described below with reference to FIG. 8.

In step S703, the CPU 201 determines whether the zenith correction is set to on by the correction setting. If the zenith correction is set to on (YES in step S703), the processing proceeds to step S704. If the zenith correction is set to off (NO in step S703), the processing proceeds to step S707.

In step S704, the CPU 201 determines whether the yaw angle correction is set to on by the correction setting. If the yaw angle correction is set to on (YES in step S704), the processing proceeds to step S705. If the yaw angle correction is set to off (NO in step S704), the processing proceeds to step S706.

In step S705, the CPU 201 displays the VR image on the display 205 by the foregoing first display method. Specifically, the CPU 201 displays the VR image with both the zenith correction and the yaw angle correction. The zenith correction and the yaw angle correction are performed based on the orientation information attached as the attribute information about the VR image to be displayed. In the case of a VR view, the CPU 201 performs the corrections based on both the orientation information attached as the attribute information about the VR image to be displayed and the current orientation of the display control device 200 detected by the orientation detection unit 213. As a result, the VR image is displayed as described in FIG. 4E.

In step S706, the CPU 201 displays the VR image on the display 205 by the foregoing second display method. Specifically, the CPU 201 displays the VR image with the zenith correction and without the yaw angle correction. The zenith correction is performed based on the orientation information attached as the attribute information about the VR image to be displayed. In the case of a VR view, the CPU 201 performs the zenith correction based on both the orientation information attached as the attribute information about the VR image to be displayed and the current orientation of the display control device 200 detected by the orientation detection unit 213. As a result, the VR image is displayed as described in FIG. 4D.

In step S707, the CPU 201 determines whether the yaw angle correction is set to on by the correction setting. If the yaw angle correction is set to on (YES in step S707), the processing proceeds to step S708. If the yaw angle correction is set to off (NO in step S707), the processing proceeds to step S709.

In step S708, the CPU 201 displays the VR image on the display 205 by the foregoing third display method. Specifically, the CPU 201 displays the VR image without the zenith correction and with the yaw angle correction. The CPU 201 performs the yaw angle correction based on the orientation information attached as the attribute information about the VR image to be displayed. In the case of a VR view, the CPU 201 performs the yaw angle correction based on both the orientation information attached as the attribute information about the VR image to be displayed and the current orientation of the display control device 200 detected by the orientation detection unit 213. As a result, the VR image is displayed as described in FIG. 4C.

In step S709, the CPU 201 displays the VR image on the display 205 by the foregoing fourth display method. Specifically, the CPU 201 displays the VR image without the zenith correction or the yaw angle correction (displays the VR image with no orientation-related correction). The CPU 201 thus displays the VR image not based on the orientation information attached as the attribute information about the VR image. As a result, the VR image is displayed as described in FIG. 4B.

Figure 8:
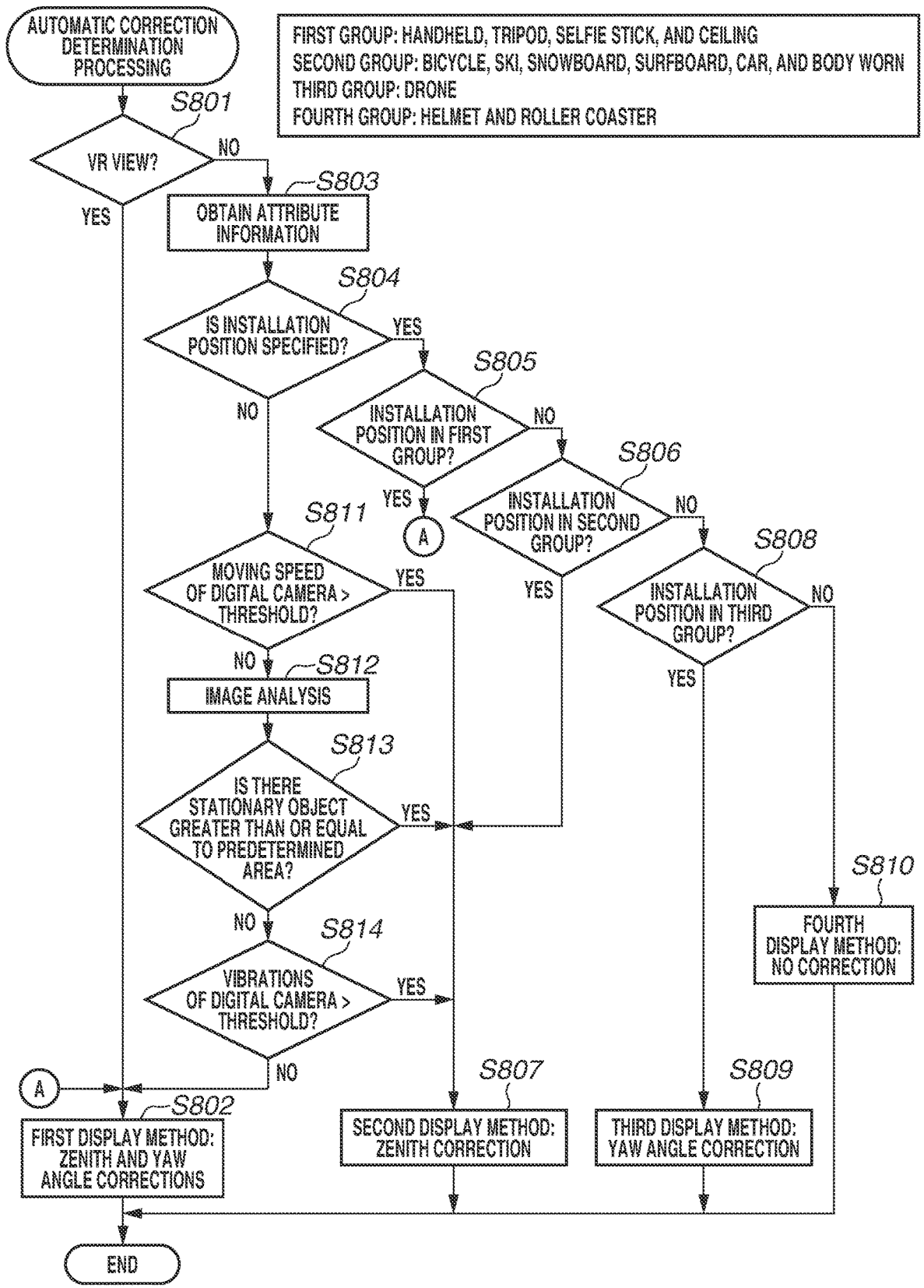
FIG. 8 is a flowchart illustrating automatic correction determination processing.

FIG. 8 illustrates a detailed flowchart of the automatic correction determination processing in step S702 of FIG. 7. This processing is implemented by the CPU 201 loading and executing a program recorded in the nonvolatile memory 203 using the memory 202 as a work memory.

In step S801, the CPU 201 determines whether a VR view is set as the display method of the VR image. If a VR view is set (YES in step S801), the processing proceeds to step S802. If a VR view is not set (NO in step S801), the processing proceeds to step S803.

In step S802, the CPU 201 displays the VR image on the display 205 by the foregoing first display method. Specifically, the CPU 201 displays the VR image with both the zenith correction and the yaw angle correction. As a result, the VR image is displayed as described in FIG. 4E. This processing is similar to that of step S705.

In step S803, the CPU 201 obtains the attribute information (metadata) about the VR image to be displayed (information acquisition or information reading).

In step S804, the CPU 201 determines whether any installation position is specified, based on the installation position information that is included in the attribute information obtained in step S803 and indicates the setting of the installation position in capturing the VR image. If no installation position is specified (NO in step S804), the processing proceeds to step S811. If any installation position is specified (YES in step S804), the processing proceeds to step S805.

In step S805, the CPU 201 determines whether the installation position is any one of installation positions included in a first group based on the installation position information included in the attribute information obtained in step S803. The first group includes at least one of a handheld position, a tripod, a selfie stick, and the ceiling. If the installation position is any one of the installation positions included in the first group (YES in step S805), the processing proceeds to step S802. In step S802, the CPU 201 displays the VR image by the first display method. If not (NO in step S805), the processing proceeds to step S806.

In step S806, the CPU 201 determines whether the installation position is any one of installation positions included in a second group based on the installation position information included in the attribute information obtained in step S803. The second group includes at least one of a bicycle, a ski, a snowboard, a surfboard, a car, and a body worn position. If the installation position is any one of the installation positions included in the second group (YES in step S806), the processing proceeds to step S807. If not (NO in step S806), the processing proceeds to step S808.

In step S807, the CPU 201 displays the VR image on the display 205 by the foregoing second display method. Specifically, the CPU 201 displays the VR image with the zenith correction and without the yaw angle correction. As a result, the VR image is displayed as described in FIG. 4D. This processing is similar to that of step S706.

In step S808, the CPU 201 determines whether the installation position is any one of installation positions included in a third group based on the installation position information included in the attribute information obtained in step S803. For example, the third group includes a drone. A hang glider, skydiving equipment, and a parachute may also be included. If the installation position is any one of the installation positions included in the third group (YES in step S808), the processing proceeds to step S809. If not (fourth group) (NO in step S808), the processing proceeds to step S810.

In step S809, the CPU 201 displays the VR image on the display 205 by the foregoing third display method. Specifically, the CPU 201 displays the VR image without the zenith correction and with the yaw angle correction. As a result, the VR image is displayed as described in FIG. 4C. This processing is similar to that of step S708.

In step S810, the CPU 201 displays the VR image on the display 205 by the foregoing fourth display method. Specifically, the CPU 201 displays the VR image without the zenith correction or the yaw angle correction (displays the VR image with no orientation-related correction). As a result, the VR image is displayed as described in FIG. 4B. This processing is similar to that of step S709.

In the present exemplary embodiment, the installation position in capturing the VR image is described to be set in advance by the user. However, this is not restrictive. If the installation position is not set by the user and can be automatically determined, the CPU 201 may perform the determinations of step S804, S805, S806, and S808 using information about the automatically determined installation position. In such a case, the determination of step S804 is NO if the installation position is not specified or unable to be automatically determined. For example, if the VR image is found to be captured with little vibration based on the detection result of the orientation detection unit 55 of the digital camera 100 during imaging, the VR image can be determined to be captured with the installation position set to a tripod. The installation position can be determined by determining the type of installation position-specific accessory (attachment) connected to the digital camera 100.

In step S811, the CPU 201 determines whether the moving speed of the digital camera 100 during imaging is higher than a threshold based on the movement information include in the attribute information obtained in step S803. If the moving speed of the digital camera 100 during imaging is higher than the threshold (YES in step S811), the processing proceeds to step S807. In step S807, the CPU 201 displays the VR image by the second display method. If not (NO in step S811), the processing proceeds to step S812.

In step S812, if the VR image to be displayed is a moving image, the CPU 201 analyzes the moving image to be displayed. This processing is similar to that of the system control unit 50 in step S512 of the flowchart illustrated in FIG. 5 described above. By this analysis during playback, the CPU 201 obtains vibration information and stationary object information. Step S812 can be skipped if the attribute information obtained in step S803 includes vibration information and stationary object information (i.e., the VR image is already analyzed during imaging).

In step S813, the CPU 201 determines whether there is a stationary object greater than or equal to a predetermined area in the VR image to be displayed. If there is a stationary object greater than or equal to a predetermined area (YES in step S813), the processing proceeds to step S807. If not (NO in step S813), the processing proceeds to step S814. The determination is YES if the attribute information obtained in step S803 includes stationary object information and the stationary object information indicates that there is a stationary object greater than or equal to a predetermined area in the VR image to be displayed. The determination is also YES if a stationary object greater than or equal to a predetermined area is determined to be present as a result of the analysis in step S812. The determination may also be YES if the VR image to be displayed is a moving image and a stationary object greater than or equal to a predetermined area is included for a predetermined time (for a predetermined period or more). The determination may also be YES if there continuous to be a stationary object greater than or equal to a predetermined area from a starting point of the recorded moving image to a predetermined time or until the end. The reason is that if the digital camera 100 capturing the VR image is installed on a vehicle, part of the vehicle on which the digital camera 100 is installed appears in the image as a stationary object greater than or equal to a predetermined area from the beginning of recording.

In step S814, the CPU 201 determines whether the vibrations of the digital camera 100 in capturing the VR image to be displayed exceed a threshold. If the vibrations of the digital camera 100 exceed the threshold (YES in step S814), the processing proceeds to step S807. If not (NO in step S814), the processing proceeds to step S802. The determination is YES if the attribute information obtained in step S803 includes vibration information and the vibration information indicates that the vibrations of the digital camera 100 capturing the VR image to be displayed exceed the threshold. The determination is also YES if the vibrations of the digital camera 100 are determined to exceed the threshold as a result of the analysis in step S812.

Whether to perform each of the zenith correction and the yaw angle correction in displaying a VR image is adaptively determined as described above. This enables the user to view the VR image in a more appropriate display. In FIGS. 7 and 8 described above, an example of using different display methods of a VR image based on the following conditions (1) to (5) has been described:

(1) Use different display methods based on the user setting about the playback method (display method) (steps S703 to S709 and S801),
(2) Use different display methods based on the setting information during imaging (steps S804 to S810),
(3) Use different display methods based on the moving speed of the digital camera 100 during imaging (step S811),
(4) Use different display methods based on the magnitude of vibration of the digital camera 100 (step S814), and
(5) Use different display methods based on the result of analysis of the video image (image analysis result) (steps S813 and S814).

The determinations based on the conditions (1) to (5) (hereinafter, may be referred to as conditional determinations (1) to (5)) are not limited to the order illustrated in FIGS. 7 and 8 described above. For example, the determination of the installation position in step S804 may be performed before the determination whether the display method is a VR view in step S801. If the installation position is already specified, the display method may be determined based on the determination of steps S805, S806, and S808. In other words, if the installation position is specified, the display method can be determined based on the installation position regardless of whether in a VR view. If the installation position is not specified, then in step S801, the CPU 201 determines whether the display method is a VR view. If the display method is a VR view (YES in step S801), the processing proceeds to step S802. If not (NO in step S801), the processing proceeds to step S811. The determination of step S813 may be performed before the determinations of steps S801, S804, S805, S806, and S808. If there is a stationary object greater than or equal to a predetermined area, the VR image may be displayed by the second display method regardless of whether in a VR view and regardless of the installation position. If there is no stationary object greater than or equal to a predetermined area, the display method is determined based on the other conditions. The order of the determinations may likewise be modified as appropriate.

All the conditional determinations (1) to (5) do not need to be performed. If at least one of the determinations is performed, the other conditional determinations do not need to be performed. For example, the processing of steps S701 and S703 to S709 may be omitted and only the processing of step S702 may be performed if the manual setting of the playback method is somehow disabled on the display control device 200. The processing of step S801 may be omitted to start the automatic correction determination processing of FIG. 8 at step S803. Specifically, regardless of whether the display method is a VR view, the display method may be determined based on the other conditions. This is not restrictive, and the conditional determinations (1) to (5) may be omitted as appropriate.

<Modification>

In the foregoing exemplary embodiment, an example of determining the display method during playback and applying the zenith correction and the yaw angle correction during playback has been described. However, this is not restrictive. A VR image to which the zenith correction and/or the yaw angle correction is/are applied may be recorded according to conditional determinations during imaging. In such a case, the playback apparatus (display control device 200) can display the VR image in a direction appropriate to the user by simply reproducing and displaying the recorded VR image with no particular determination or correction processing.

Figure 9:
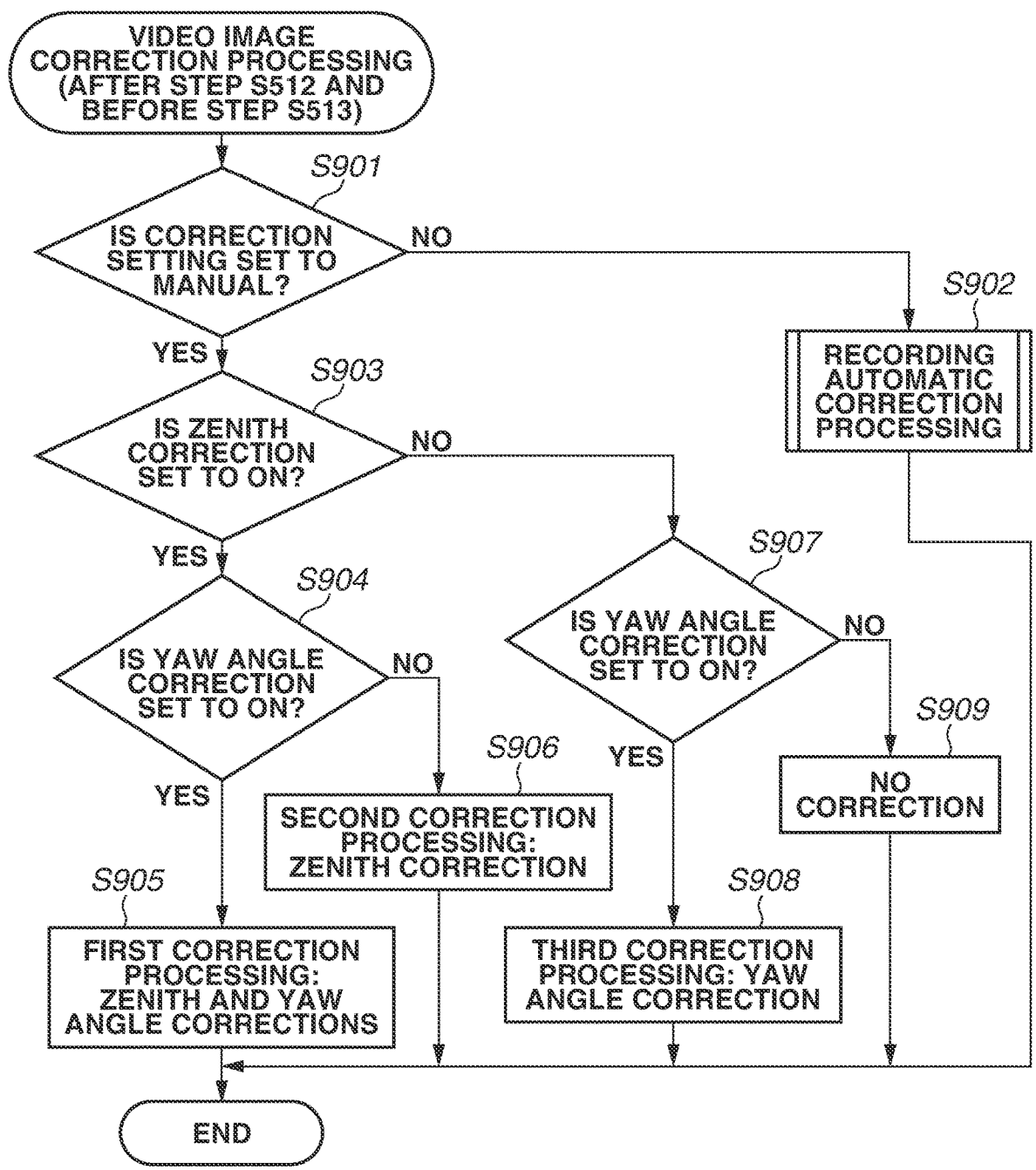
FIG. 9 is a flowchart illustrating video image correction processing.

FIG. 9 illustrates an example of the conditional determinations during imaging. FIG. 9 is a flowchart illustrating an example of video image correction processing performed by the digital camera 100. This processing is performed after the processing of S512 and before the processing of step S513 described in the foregoing FIG. 5. This processing is implemented by loading a program stored in the nonvolatile memory 56 into the system memory 52 and executing the program by the system control unit 50.

In step S901, the system control unit 50 refers to the settings recorded in the nonvolatile memory 56 and determines whether the correction setting is set to manual. In the present modification, if the correction setting is not set to manual (set to automatic) (NO in step S901), the processing proceeds to step S902. If the correction setting is set to manual (YES in step S901), the processing proceeds to step S903. The correction setting is a setting that is set in advance by the digital camera 100 based on user operations for the zenith correction and the yaw angle correction on the VR image and recorded in the nonvolatile memory 56. In making the correction setting, a correction setting screen, such as illustrated in FIG. 6B, is displayed on the display 205 of the display control device 200, which is an external apparatus connected to the digital camera 100. The correction setting screen may be displayed on the display unit 28 of the digital camera 100. The user can select either automatic or manual on the correction setting screen. If manual is selected, whether to turn on or off each of the zenith correction and the yaw angle correction can be separately selected. After the selection operations by the user, the system control unit 50 records the selections as the correction setting into the nonvolatile memory 56.

In step S902, the system control unit 50 performs recording automatic correction processing. This processing will be described below with reference to FIG. 10.

The processing of steps S903 and S904 is similar to that described to be performed by the CPU 201 in steps S703 and S704 of FIG. 7 described above. A description thereof will thus be omitted. Instead of the nonvolatile memory 203, the nonvolatile memory 56 is referred to for the setting information.

In step S905, the system control unit 50 applies first correction processing to the VR image by using the image processing unit 24. Specifically, the system control unit 50 applies both the zenith correction and the yaw angle correction. After the processing of step S905 ends, the processing proceeds to step S513. In step S513, the system control unit 50 records the moving image (VR image) on which the first correction processing is performed in step S905. If the moving image thus recorded is reproduced without correction processing, the VR image can be viewed in a manner similar to by the foregoing first display method. To prevent redundant application of the correction processing to the corrected VR image in a playback step, at least either one of the following two processes is applied to the corrected VR image. A first process is to attach attribute information indicating that both the zenith and the yaw angle are corrected. If such attribute information indicating the completion of the corrections is attached, the display control device 200 displays the VR image by the fourth display method regardless of the foregoing conditional determinations (1) to (5). A second process is to record the orientation information about the corrected VR image such that there is neither a tilt of the zenith nor a change in the yaw angle. In displaying such a VR image having neither a tilt of the zenith nor a change in the yaw angle, the display control device 200 does not correct the zenith or the yaw angle regardless of which of the first to fourth display methods is used. The VR image is thus displayed with the zenith and the yaw angle unchanged no matter if the foregoing conditional determinations (1) to (5) are performed and no matter which of the first to fourth display methods is thereby selected.

In step S906, the system control unit 50 applies second correction processing to the VR image using the image processing unit 24. Specifically, the system control unit 50 applies the zenith correction without applying the yaw angle correction. After the processing of step S906 ends, the processing proceeds to step S513. In step S513, the system control unit 50 records the moving image (VR image) on which the second correction processing is performed in step S906. If the moving image thus recorded is reproduced without correction processing, the VR image may be viewed in a manner similar to by the foregoing second display method. To prevent redundant application of the correction processing to the corrected VR image in a playback step, at least either one of the following two processes is applied to the corrected VR image. A first process is to attach attribute information indicating that both the zenith and the yaw angle are corrected. Although the yaw angle is not corrected, the attribute information indicates that the yaw angle is corrected, so that the correction will not be performed in a playback step. If such attribute information indicating the completion of the corrections is attached, the display control device 200 displays the VR image by the fourth display method regardless of the foregoing conditional determinations (1) to (5). A second process is to record the orientation information about the corrected VR image such that there is neither a tilt of the zenith nor a change in the yaw angle. In displaying such a VR image having neither a tilt of the zenith nor a change in the yaw angle, the display control device 200 does not correct the zenith or the yaw angle regardless of which of the first to fourth display methods is used. The VR image is thus displayed with the zenith and the yaw angle unchanged no matter if the foregoing conditional determinations (1) to (5) are performed and no matter which of the first to fourth display methods is thereby selected.

In step S907, the system control unit 50 determines whether the yaw angle correction is set to on by the correction setting. If the yaw angle correction is set to on (YES in step S907), the processing proceeds to step S908. If the yaw angle correction is set to off (NO in step S907), the processing proceeds to step S909.

In step S908, the system control unit 50 applies third correction processing to the VR image using the image processing unit 24. Specifically, the system control unit 50 applies the yaw angle correction without applying the zenith correction. After the processing of step S908 ends, the processing proceeds to step S513. In step S513, the system control unit 50 records the processed moving image (VR image) on which the third correction processing is performed in step S908. If the moving image thus recorded is reproduced without correction processing, the VR image can be viewed in a manner similar to by the foregoing third display method. To prevent redundant application of the correction processing to the corrected VR image in a playback step, at least either one of the following two processes is applied to the corrected VR image. A first process is to attach attribute information indicating that both the zenith and the yaw angle are corrected. Although the zenith is not corrected, the attribute information indicates that the zenith is corrected, so that the correction will not be performed in a playback step. If such attribute information indicating the completion of the corrections is attached, the display control device 200 displays the VR image by the fourth display method regardless of the foregoing conditional determinations (1) to (5). A second process is to record the orientation information about the corrected VR image such that there is neither a tilt of the zenith nor a change in the yaw angle.

In step S909, the system control unit 50 records the VR image without applying the zenith correction or the yaw angle correction. After the processing of step S909 ends, the processing proceeds to step S513. In step S513, the system control unit 50 records the uncorrected moving image (VR image). If the moving image thus recorded is reproduced without correction processing, the VR image may be viewed in a manner similar to by the foregoing fourth display method. To prevent such a VR image that is determined to not be corrected from application of new correction processing in a playback step, at least either one of the following two processes is applied to the VR image. A first process is to attach attribute information indicating that both the zenith and the yaw angle are corrected. Although neither the zenith nor the yaw angle is corrected, the attribute information indicates that the zenith and the yaw angle are corrected, so that a new correction will not be performed in a playback step. If such attribute information indicating the completion of the corrections is attached, the display control device 200 displays the VR image by the fourth display method regardless of the foregoing conditional determinations (1) to (5). A second process is to record the orientation information about the corrected VR image such that there is neither a tilt of the zenith nor a change in the yaw angle.

Figure 10:
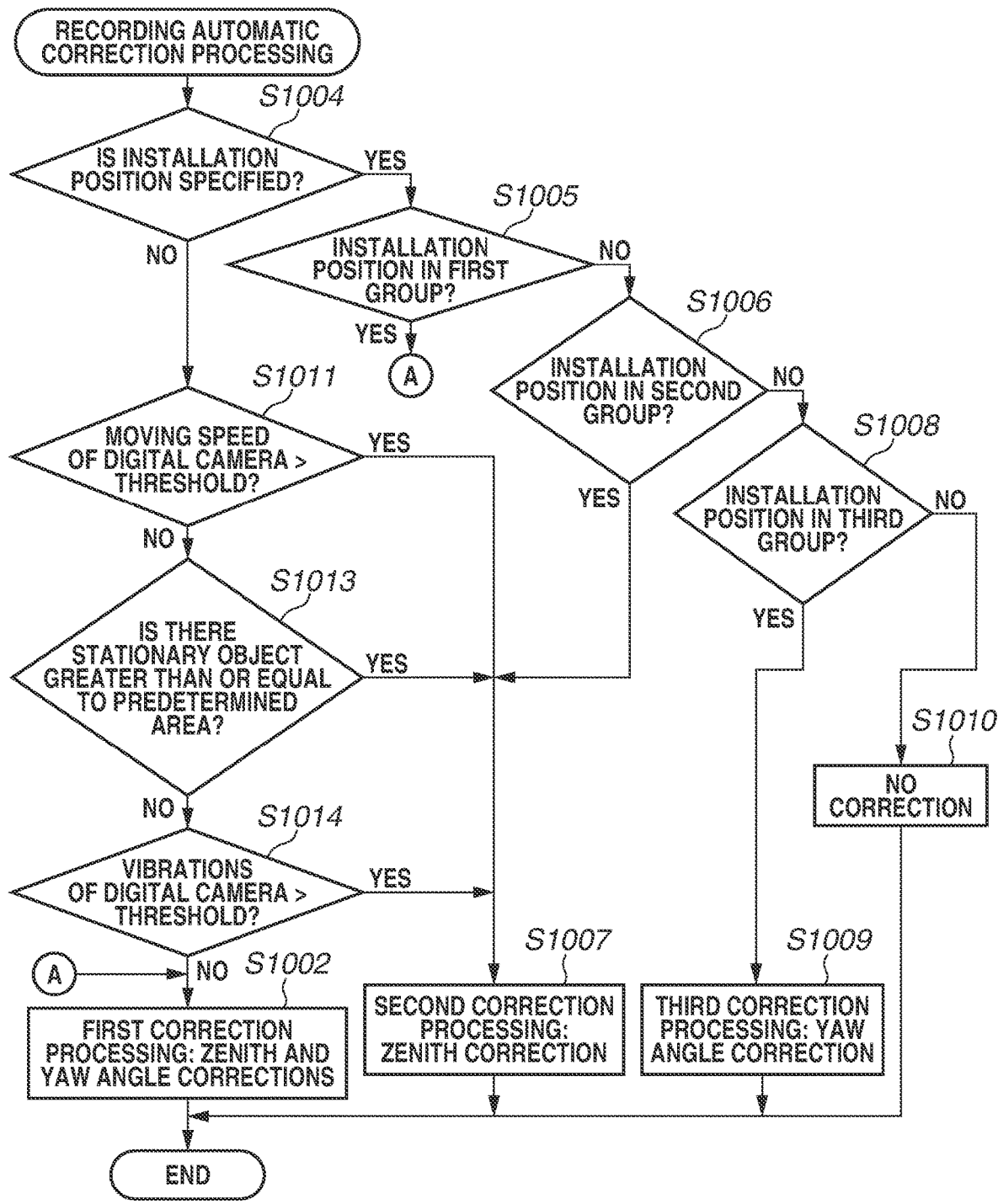
FIG. 10 is a flowchart illustrating automatic correction processing during recording.

FIG. 10 illustrates a detailed flowchart of the recording automatic correction processing in step S902 of FIG. 9. This processing is implemented by the system control unit 50 loading and executing a program recorded in the nonvolatile memory 56 using the system memory 52 as a work memory.

In step S1004, the system control unit 50 refers to the setting state of the installation position stored in the nonvolatile memory 56, and determines whether any installation position is specified. If no installation position is specified (NO in step S1004), the processing proceeds to step S1011. If any installation position is specified (YES in step S1004), the processing proceeds to step S1005.

In step S1005, the system control unit 50 performs processing similar to that described to be performed by the CPU 201 in step S805 of FIG. 8 described above. If the installation position is any one of the installation positions included in the first group (YES in step S1005), the processing proceeds to step S1002. If not (NO in step S1005), the processing proceeds to step S1006.

In step S1006, the system control unit 50 performs processing similar to that described to be performed by the CPU 201 in step S806 of FIG. 8 described above. If the installation position is any one of the installation positions included in the second group (YES in step S1006), the processing proceeds to step S1007. If not (NO in step S1006), the processing proceeds to step S1008.

In step S1008, the system control unit 50 performs processing similar to that described to be performed by the CPU 201 in step S808 of FIG. 8 described above. If the installation position is any one of the installation positions included in the third group (YES in step S1008), the processing proceeds to step S1009. If not (NO in step S1008), the processing proceeds to step S1010.

In step S1011, the system control unit 50 determines whether the moving speed of the digital camera 100 detected in step S509 is higher than a threshold. If the digital camera 100 is moving at a moving speed higher than the threshold (YES in step S1011), the processing proceeds to step S1007. If not (NO in step S1011), the processing proceeds to step S1013.

In step S1013, the system control unit 50 determines whether there is a stationary object greater than or equal to a predetermined area in the VR image to be recorded, based on the result of analysis in step S506 or S512. If there is a stationary object greater than or equal to a predetermined area (YES in step S1013), the processing proceeds to step S1007. If not (NO in step S1013), the processing proceeds to step S1014. The determination of step S1013 may also be YES if a stationary object greater than or equal to a predetermined area is included in the recorded moving image for a predetermined time. The determination may also be YES if there continues to be a stationary object greater than or equal to a predetermined area from a starting point of the recorded moving image to the current point in time. The reason is that if the digital camera 100 capturing the VR image is installed on a vehicle, part of the vehicle on which the digital camera 100 is installed appears in the recorded moving image as a stationary object greater than or equal to a predetermined area from the beginning of recording.

In step S1014, the system control unit 50 determines whether the vibrations of the digital camera 100 exceed a threshold (whether the digital camera 100 is making vibrations satisfying a predetermined condition) based on the result of detection in step S508. If the vibrations of the digital camera 100 exceed the threshold (YES in step S1014), the processing proceeds to step S1007. If not (NO in step S1014), the processing proceeds to step S1002.

In step S1002, the system control unit 50 applies the first correction processing to the VR image. This processing is similar to that of the foregoing step S905.

In step S1007, the system control unit 50 applies the second correction processing to the VR image. This processing is similar to that of the foregoing step S906.

In step S1009, the system control unit 50 applies the third correction processing to the VR image. This processing is similar to that of the foregoing step S908.

In step S1010, the system control unit 50 does not apply correction processing to the VR image. This processing is similar to that of the foregoing step S909.

In such a manner described above, when recording a VR image that is a moving image, the system control unit 50 can perform correction and record the processed image. The system control unit 50 can similarly perform correction and record a VR image that is a still image in step S520 of FIG. 5.

In addition to the foregoing processing of FIGS. 8 and 10, the VR image can be displayed by the first display method or subjected to the first correction processing if the imaging setting is time-lapse imaging (interval imaging). The reason is that the time-lapse imaging is considered to be dedicated to applications such that the digital camera 100 is installed on a stationary object and used to record the movement of nearby moving objects moving at very low speed.

The foregoing various controls described to be performed by the system control unit 50 and the foregoing various controls described to be performed by the CPU 201 may be performed by a single piece of hardware. A plurality of pieces of hardware can control the entire apparatus(es) by performing processing in a distributed manner Examples of the plurality of pieces of hardware include a plurality of processors, a plurality of circuits, and both a processor and a circuit.

While the exemplary embodiment of the present invention has been described in detail, the present invention is not limited to such a specific exemplary embodiment, and various modes not departing from the gist of the present invention are also embraced by the present invention. The foregoing exemplary embodiment only demonstrates one exemplary embodiment of the present invention, and various exemplary embodiments may be combined as appropriate.

The foregoing exemplary embodiment is described by using a case where an exemplary embodiment of the present invention is applied to the digital camera 100 or the display control device 200 as an example. However, such an example is not restrictive. An exemplary embodiment of the present invention is applicable to any electronic apparatus that can capture or display a VR image. More specifically, an exemplary embodiment of the present invention is applicable to a personal computer, a personal digital assistant (PDA), a mobile phone terminal, a portable image viewer, a printer apparatus including a display, a digital photo frame, a music player, a game console, and an electronic book reader.

According to an exemplary embodiment of the present invention, a wide range image can be displayed in a more appropriate direction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254237, filed Dec. 28, 2017, which is hereby incorporated by reference herein in its entirety.

What is claimed is:

1. An electronic apparatus comprising:
one or more processors; and
at least one memory storing executable instructions, which when executed by the one or more processors, cause the electronic apparatus to perform the operations of the following units comprising:
    obtaining a wide range image captured by one or more imaging units;
    obtaining attribute information attached to the wide range image, the attribute information including orientation information indicating an orientation of an imaging apparatus during imaging; and
    selecting one of a plurality of processes to display the wide range image, the plurality of processes including a first process providing a display in which a zenith and a yaw angle is corrected based on the orientation information, a second process providing a display in which the zenith is corrected based on the orientation information without correcting the yaw angle, a third process providing a display in which the yaw angle is corrected based on the orientation information without correcting the zenith, and a fourth process providing a display in which neither the zenith nor the yaw angle of the wide range image is corrected, wherein selecting one of the plurality of processes to display the wide range image comprises:
        determining whether an installation position of the imaging apparatus during capturing of the wide range image is specified;
        if the installation position of the imaging apparatus during capturing of the wide range image is specified, selecting one of the first process, the second process, the third process, and the fourth process based on a type of the specified installation position; and
        if the installation position of the imaging apparatus during capturing of the wide range image is not specified, selecting one of the first process and the second process in which at least the zenith is corrected based on the orientation information.

2. The electronic apparatus according to claim 1, wherein, if the wide range image is displayed in a virtual reality (VR) view in which a display range is changed and displayed based on a change in an orientation of the electronic apparatus, the first process is selected and the wide range image is displayed.

3. The electronic apparatus according to claim 1, wherein the installation position of the imaging apparatus during capturing of the wide range image is specified based on information included in the attribute information.

4. The electronic apparatus according to claim 3, wherein the selecting one of the plurality of processes to display the wide range image comprises selecting the first process if the installation position is any one of positions including not specified, a selfie stick, and a handheld position.

5. The electronic apparatus according to claim 3, wherein the selecting one of the plurality of processes to display the wide range image comprises selecting the second process if the installation position is any one of positions including a car, a bicycle, a ski, a snowboard, and a body worn position.

6. The electronic apparatus according to claim 3, wherein the selecting one of the plurality of processes to display the wide range image comprises selecting the third process if the installation position is a position including a drone.

7. The electronic apparatus according to claim 3, wherein the selecting one of the plurality of processes to display the wide range image comprises selecting the fourth process if the installation position is any one of positions including a helmet and a roller coaster.

8. The electronic apparatus according to claim 1, wherein the wide range image includes a VR image.

9. The electronic apparatus according to claim 1, wherein the wide range image is at least any one of images including an omnidirectional image, an entire celestial sphere image, and an image having a field of view angle of 180° or more.

10. A method for controlling an electronic apparatus, the method comprising:
obtaining a wide range image captured by one or more imaging units;
obtaining attribute information attached to the wide range image, the attribute information including orientation information indicating an orientation of an imaging apparatus during imaging; and
selecting one of a plurality of processes to display the wide range image, the plurality of processes including a first process providing a display in which a zenith and a yaw angle are corrected based on the orientation information, a second process providing a display in which the zenith is corrected based on the orientation information without correcting the yaw angle, a third process providing a display in which the yaw angle is corrected based on the orientation information without correcting the zenith, and a fourth process providing a display in which neither the zenith nor the yaw angle of the wide range image is corrected, wherein selecting one of the plurality of processes to display the wide range image comprises:
determining whether an installation position of the imaging apparatus during capturing of the wide range image is specified;
if the installation position of the imaging apparatus during capturing of the wide range image is specified, selecting one of the first process, the second process, the third process, and the fourth process based on a type of the specified installation position; and
if the installation position of the imaging apparatus during capturing of the wide range image is not specified, selecting one of the first process and the second process in which at least the zenith is corrected based on the orientation information.

11. A non-transitory computer-readable storage medium storing a computer program that, when executed by an electronic apparatus, causes the electronic apparatus to perform a method according to claim 10.

12. An electronic apparatus comprising:
one or more processors; and
at least one memory storing executable instructions, which when executed by the one or more processors, cause the electronic apparatus to perform operations comprising:
obtaining a wide range image captured by one or more imaging units;
obtaining orientation information indicating an orientation of an imaging apparatus in capturing the wide range image; and
selecting one of a plurality of processes, applying of the selected process to the wide range image, and recording of the processed wide range image, the plurality of processes including a first process including processing for correcting a zenith and a yaw angle based on the orientation information, a second process including processing for correcting the zenith based on the orientation information without correcting the yaw angle, a third process including processing for correcting the yaw angle based on the orientation information without correcting the zenith, and a fourth process correcting neither of the zenith nor the yaw angle of the wide range image wherein selecting one of the plurality of processes comprises:
determining whether an installation position of the imaging apparatus during capturing of the wide range image is specified;
if the installation position of the imaging apparatus during capturing of the wide range image is specified, selecting one of the first process, the second process, the third process, and the fourth process based on a type of the specified installation position; and
if the installation position of the imaging apparatus during capturing of the wide range image is not specified, selecting one of the first process and the second process in which at least the zenith is corrected based on the orientation information.

13. The electronic apparatus according to claim 12, the operations further comprising:
on the processed wide range image to which any one of the first to fourth processes is applied:
attaching and recording attribute information indicating that the processed wide range image has already been processed by the application of any one of the first to fourth processes;
not recording information indicating the orientation of the imaging apparatus during imaging; and
recording orientation information indicating absence of a tilt with respect to a direction of gravity, and control of recording of the processed wide image.

14. A method for controlling an electronic apparatus, the method comprising:
obtaining a wide range image captured by one or more imaging units, the wide range image having a field view angle of 180° or more;
obtaining orientation information indicating an orientation of an imaging apparatus during capturing of the wide range image; and
selecting one of a plurality of processes, applying of the selected process to the wide range image, and recording of the processed wide range image, the plurality of processes including a first process including processing for correcting a zenith and a yaw angle based on the orientation information, a second process including processing for correcting the zenith based on the orientation information without correcting the yaw angle, a third process including processing for correcting the yaw angle based on the orientation information without correcting the zenith, and a fourth process correcting neither of the zenith nor the yaw angle of the wide range image wherein selecting one of the plurality of processes comprises:
determining whether an installation position of the imaging apparatus during capturing of the wide range image is specified;
if the installation position of the imaging apparatus during capturing of the wide range image is specified, selecting one of the first process, the second process, the third process, and the fourth process based on a type of the specified installation position; and if the installation position of the imaging apparatus during capturing of the wide range image is not specified, selecting one of the first process and the second process in which at least the zenith is corrected based on the orientation information.

15. A non-transitory computer-readable storage medium storing a computer program that, when executed by an electronic apparatus, causes the electronic apparatus to perform a method according to claim 14.

* * * * *